(12) United States Patent
Takeyama et al.

(10) Patent No.: US 6,168,201 B1
(45) Date of Patent: *Jan. 2, 2001

(54) GAS GENERATING APPARATUS FOR AIR BAG APPARATUS AND METHOD FOR INFLATING AIR BAG

(75) Inventors: Shigeru Takeyama; Takuhiro Ono; Yoshikazu Kawauchi; Kiyoshi Yamamori; Norimasa Eto; Hiroyuki Takahashi; Mitsugu Tsuyuki; Yasushi Usui, all of Kanagawa (JP)

(73) Assignees: Matsushita Electric Industrial, Osaka; Miyata Industry Co., Ltd., Kanagawa, both of (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/930,252

(22) PCT Filed: Jan. 31, 1997

(86) PCT No.: PCT/JP97/00226

§ 371 Date: Jan. 2, 1998

§ 102(e) Date: Jan. 2, 1998

(87) PCT Pub. No.: WO97/28025

PCT Pub. Date: Aug. 7, 1997

(30) Foreign Application Priority Data

Jan. 31, 1996 (JP) .................................................... 8-016214
Jun. 12, 1996 (JP) .................................................... 8-151390
Oct. 21, 1996 (JP) .................................................... 8-277896

(51) Int. Cl.[7] .............................................................. B60R 21/26
(52) U.S. Cl. ............................................... 280/737; 280/741
(58) Field of Search ........................................ 280/737, 741, 280/736, 739, 740, 742

(56) References Cited

U.S. PATENT DOCUMENTS

| 5,263,740 | * | 11/1993 | Frey et al. ........................... 280/737 |
| 5,344,186 | * | 9/1994 | Bergerson et al. .................. 280/741 |
| 5,348,344 | * | 9/1994 | Blumenthal et al. ................ 280/737 |
| 5,531,473 | * | 7/1996 | Rink et al. ........................... 280/737 |
| 5,779,266 | * | 7/1998 | Moore et al. ........................ 280/737 |

* cited by examiner

*Primary Examiner*—Peter C. English
(74) *Attorney, Agent, or Firm*—Armstrong, Westerman, Hattori, McLeland & Naughton

(57) ABSTRACT

The present invention relates to a gas generating apparatus for an air bag apparatus mounted in a vehicle or the like for protecting a passenger of the vehicle by charging a gas into an air bag interposed between the passenger and an interior member of the vehicle chamber so as to inflate the air bag at the time of collision of the vehicle. The gas generating apparatus for the air bag apparatus includes a first chamber 9 which accommodates a combustible fluid 7 and which is provided with a first vent opening 8 leading to the air bag 3; a second chamber 5 larger than the first chamber 9; a first occluding member 13 for occluding the first vent opening 8; and an ignition device 14 for igniting the combustible fluid in the first chamber 9. By burning at least a portion of the combustible fluid 7 within the first chamber 9, the fluid in the first and second chambers 9 and 5 is discharged through the first vent opening 8 to inflate the air bag 3. Since, the first occluding member is swiftly broken to discharge a mixture of the combustible fluid in the first chamber, it is possible to shorten the initial responding time period required to start inflating the air bag.

44 Claims, 23 Drawing Sheets

GAS GENERATING APPARATUS FOR AIR BAG APPARATUS AND METHOD FOR INFLATING AIR BAG

TECHNICAL FILED

The present invention relates to a gas generating apparatus for an air bag apparatus mounted in a vehicle or the like for charging a gas, at the time of collision of the vehicle, into an air bag interposed between a passenger and an interior member of the vehicle chamber so as to inflate the air bag, thereby protecting the passenger of the vehicle.

BACKGROUND ART

Conventionally, in the gas generating apparatus for the air bag apparatus, an inert gas such as a compressed nitrogen gas or argon gas is used. Japanese Patent Application Laid-open No. 5-278554 discloses an apparatus which uses a combustible gas mixture. In this apparatus, the combustible gas mixture accommodated in a pressure container is ignited from its one end surface, and when the gas pressure is increased due to a rise of the temperature by combustion, the other end surface of the pressure container is broken by such a pressure, which allows the combustion gas to flow therefrom into the air bag to inflate the same.

However, in the initial state in which the combustible gas mixture is ignited in the conventional apparatus as disclosed in this Japanese Patent Application Laid-open No. 5-278554, among the entire gas in the pressure container, only gas at the side of the ignition is burnt, and gas at the side of the other end surface is prone not to be burnt. Therefore, it is difficult to effectively utilize the entire combustible gas mixture, or it takes a long time to increase the pressure within the pressure container. As a result, a problem is brought about that the initial responding time period is elongated.

Further, in such a gas generating apparatus for the air bag apparatus, it is necessary that the initial responding speed of the air bag apparatus at the time of operation is high, and it is also necessary that a time period required for completing the inflation of the air bag can variously be varied in accordance with a volume of the air bag and speed which are determined for the type of a vehicle in view of a size and a shape of the vehicle.

Furthermore, in the conventional apparatus as disclosed in the above mentioned publication, the air bag is inflated by ignition of the gas mixture, and an inflating characteristic up to the completion of inflating operation follows a previously designed characteristic. Therefore, such a characteristic is fixed at the designing stage. However, the inflating characteristic should not necessarily be limited to only one value in view of various conditions such as a degree of a collision, a position of a sitting passenger, a difference in physique of passengers and the like. For this reason, it is required to provide an air bag apparatus in which a degree of freedom at the time of operation of the air bag apparatus is ensured so that the inflating characteristic can appropriately be varied in accordance with the above mentioned various conditions.

Therefore, a major object of the present invention is to provide a gas generating apparatus for an air bag apparatus in which a fluid mixture (which will be called as "combustion fluid mixture" hereinafter) which is generated after a combustible fluid mixture is sufficiently burnt is effectively and swiftly fed into the air bag, and in which a time period required for completing the inflation of the air bag can variously be changed by means of a simple structure.

Further, another object of the invention is to realize an inflating characteristic which corresponds to various conditions at the time of operation of the air bag apparatus.

Further, another object of the invention is to realize a reliable gas generating apparatus for an air bag apparatus with a simple structure in which the combustible fluid mixture can be burnt swiftly, and only the combustion fluid mixture can swiftly be fed into the air bag and hence, responding speed is high, by dividing a combustion chamber into a first chamber and a second chamber.

A further object of this invention is to control the direction of the fluid flowing through a third vent opening from a first chamber into a second chamber, when the combustible fluid mixture in the first chamber is ignited and the ignited combustion fluid mixture is introduced into the second chamber.

A still further object of the invention is to control the communication state between the first chamber and the second chamber in accordance with a given condition, and to control the inflating state of the air bag.

A still further object of the invention is to control an amount of the combustion fluid mixture introduced into the air bag with respect to the given condition so as to control the inflating state of the air bag.

DISCLOSURE OF THE INVENTION

According to claim 1, there is provided a gas generating apparatus for an air bag apparatus, comprising:

a first chamber accommodating a combustible fluid and provided with a first vent opening which is in communication with an air bag; a second chamber which is larger than the first chamber and which accommodates a combustible fluid and/or an inert fluid; a first occluding member for occluding the first vent opening; and ignition means for igniting the combustible fluid in the first chamber; wherein at least a portion of the combustible fluid in the first chamber is burnt, thereby discharging the fluid in the first and second chambers through the first vent opening to inflate the air bag.

With the above arrangement, the chamber for accommodating the combustible is fluid divided into first and second chambers, and the combustible fluid is ignited in the first chamber provided with the first vent opening which is in communication with the air bag. Therefore, it is possible to break the first occluding member swiftly, and to discharge the combustion fluid mixture within this first chamber. Thus, the initial responding time period in which the air bag starts inflating can be shortened.

Because the first chamber is smaller than the second chamber, this effect is further enhanced.

According to claim 2, in addition to claim 1, the gas generating apparatus for the air bag apparatus further includes a second vent opening for bringing the first and second chambers into communication with each other, and a second occluding member for occluding the second vent opening, wherein when the combustible fluid in the first chamber is burnt, the first chamber is substantially closed.

With this arrangement, when the combustible fluid in the first chamber is burnt, because the first chamber is substantially closed, a pressure within the first chamber can reliably be increased by the combustion. Therefore, the first occluding member can reliably and swiftly be broken, and the initial responding time period in which the air bag starts inflating can be shortened. Here, it should be noted that the expression that the first chamber is "substantially closed" means that the first chamber is closed to such an extent that a pressure rise which is necessary to break the first occluding member is not prevented.

According to claim 3, in addition to claim 2, the second occluding member is provided outside the first chamber.

With such an arrangement, it is possible to easily mount the second occluding member.

According to claim 4, in addition to claim 2, the second occluding member is provided inside the first chamber.

With this arrangement, it is possible to control a direction of the pressure for breaking the second occluding member.

According to claim 5, in addition to claim 2, the second occluding member is formed to be broken easier by a pressure from the second chamber than by a pressure from the first chamber.

With this arrangement, when the fluid in the second chamber is burnt or expanded after the discharge of the fluid in the first chamber into the air bag is started, the second occluding member is broken. Therefore, the first occluding member is reliably and swiftly broken to shorten the initial responding time period in which the air bag starts inflating. Further, because the fluid in the second chamber is discharged later than the fluid in the first chamber, it is possible to reliably burn or expand the fluid in the second chamber.

According to claim 6, in addition to any one of claims 2 to 5, the first chamber includes a third vent opening which is in communication with the second chamber, the third vent opening having an opening area smaller than that of the second vent opening and/or a length longer than that of the second vent opening.

With this arrangement, when the combustible fluid in the first chamber is ignited, the generated combustion fluid mixture is introduced from the third vent opening into the second chamber. Therefore, it is possible to burn or expand the fluid in the second chamber with the simple structure.

According to claim 7, in addition to claim 6, the third vent opening is formed in a side wall of the first chamber. With this arrangement, it is possible to burn the fluid in the second chamber with the simple structure.

According to claim 8, in addition to claim 6, the third vent opening is formed in the second occluding member. With this arrangement, it is possible to burn the fluid in the second chamber with a simple structure also.

According to claim 9, in addition to claim 6, the third vent opening is a clearance formed between the second occluding member and the first chamber. With this arrangement, it is possible to burn the fluid in the second chamber with a simple structure also.

According to claim 10, in addition to any one of claims 1 to 9, the first occluding member is broken by an increase in pressure within the first chamber. With this arrangement, the combustion fluid mixture can swiftly be supplied to the air bag.

According to claim 11, in addition to any one of claims 1 to 10, the second occluding member is broken by a difference between a pressure within the first chamber and a pressure within the second chamber. With this arrangement, the combustion fluid mixture can swiftly be supplied to the air bag.

According to claim 12, in addition to claim 1, the first chamber is provided at one end thereof with the first vent opening, and the other end of the first chamber is formed into a narrow cylindrical shape and is opened within the second chamber. With this arrangement, it is possible to provide an inexpensive gas generating apparatus having a simple structure without using a second occluding member.

According to claim 13, in addition to any one of claims 1 to 12, the first chamber is provided, at an end surface thereof to which the first vent opening is provided, with a gas diffusing member having a plurality of fluid diffusing holes directed in a radial direction. With this arrangement, it is possible to weaken the inertia force caused by the fluid ejected from the first vent opening.

According to claim 14, in addition to any one of claims 1 to 13, the first chamber and/or the second chamber includes an oxidizer, or the oxidizer and an inert gas. With this arrangement, it is possible to use a combustible fluid which is easy to handle and to obtain.

According to claim 15, in addition to claim 1, the gas generating apparatus further includes a third vent opening for bringing the first and second chambers into communication with each other, and control means for controlling a communication state of the third vent opening and an inflation state of the air bag. With this arrangement, it is possible to vary the flowing speed of the combustion fluid mixture into the air bag.

According to claim 16, in addition to claim 15, the control means includes a shutter member for closing the third vent opening between its fully opened state and its minimum opening area, the shutter member maintains the third vent opening in the fully opened state in a normal state, closes the third vent opening such as to assume the minimum opening area when the automobile collides at high speed, and in other cases, operates to bring the third vent opening to assume a predetermined opening area between the fully opened state and the minimum opening area in accordance with a degree of the collision of the automobile. With this arrangement, the inflating characteristic of the air bag can be controlled by controlling the combustion of the second chamber.

According to claim 17, in addition to claim 15, the control means includes an inertially moving member mounted within the first chamber and capable of moving in an axial direction of the first chamber, the inertially moving member decreasing a volume of the first chamber in accordance with a degree of collision at the time of collision of the automobile. With this arrangement, it is possible to vary the initial responding time period of the air bag.

According to claim 18, in addition to claim 17, the inertially moving member is biased in a direction to maximize the volume of the first chamber.

According to claim 19, in addition to claim 17 or 18, the first chamber is provided such as to extend into the second chamber in its axial direction.

According to claim 20, in addition to claim 17 or 18, the first chamber is provided to extend in the second chamber in a direction substantially perpendicular to the axial direction of the second chamber.

According to claim 21, in addition to any one of claims 17 to 20, the third vent opening is provided in plural in a side wall of the first chamber at a predetermined distance from one another in a longitudinal direction of the first chamber, the inertially moving member occludes a predetermined number of the third vent openings in accordance with a degree of collision.

According to claim 22, in addition to claim 21, the inertially moving member maximizes the volume of the first chamber, and is biased in a position to open all of the third vent openings.

According to claim 23, in addition to claim 21 or 22, the third vent opening comprises a slit portion formed such as to extend in a longitudinal direction of the first chamber.

According to claim 24, in addition to claim 1, the gas generating apparatus further includes a discharging means provided between the first vent opening and the air bag for discharging gas to an exterior, and a control means for controlling a communication state between the discharging means and the exterior in accordance with a predetermined condition, wherein the control means controls the inflation state of the air bag. With this arrangement, it is possible to provide an inflating characteristic which corresponds to various conditions at the time of operation of the air bag apparatus by discharging a portion of the combustion fluid mixture outside the air bag apparatus.

According to claim 25, in addition to claim 24, the gas generating apparatus further includes a discharge port, wherein the control member includes a shutter means for adjusting the discharge port between its fully opened state and fully closed state, the shutter member maintains the fully opened state of the discharge port in a normal state, closes the discharge port completely when the automobile collides at high speed, and in other cases, adjusts to bring the discharge port into a predetermined opened state between the fully opened state and the fully closed state in accordance with a degree of the collision of the automobile. With this arrangement also, it is possible to provide the inflating characteristic which corresponds to various conditions at the time of operation of the air bag apparatus.

According to claim 26, in addition to claim 1, the ignition means includes an igniting portion extending into the first chamber, the first chamber being provided at an inner wall surface thereof in the vicinity of the igniting portion with a convex portion. With this arrangement, the initial responding time period of the air bag can be shortened by the convex portion.

According to claim 27, there is provided a gas generating apparatus for an air bag apparatus, comprising: a first chamber accommodating a combustible fluid and provided with a first vent opening which is in communication with an air bag; a second chamber which is larger than the first chamber and which accommodates a combustible fluid and/or an inert fluid; a first occluding member for occluding the first vent opening; a second vent opening for bringing the first chamber and the second chamber into communication with each other; a second occluding member for occluding the second vent opening; a third vent opening for bringing the first chamber and the second chamber into communication with each other, the third vent opening having a sectional area smaller than that of the second vent opening and/or a length longer than that of the second vent opening; and ignition means for igniting the combustible fluid in the first chamber; wherein at least a portion of the combustible fluid in the first chamber is burnt by the ignition means, the fluid in the second chamber is burnt and/or expanded by the third vent opening, a fluid in the first chamber is discharged from the first vent opening, and the fluid in the second chamber is discharged from the first vent opening through at least the second vent opening, thereby inflating the air bag.

With this arrangement, the chamber accommodating the combustible fluid is divided into the first and the second chambers, and the combustible fluid accommodated in the first chamber having the first vent opening which is in communication with the air bag is ignited, thereby swiftly breaking the first occluding member to discharge the generated combustion fluid mixture within this first chamber. Therefore, it is possible to shorten the initial responding time period in which the air bag starts inflating. This effect is further enhanced because the first chamber is formed smaller than the second chamber. Also, a portion of the combustion fluid mixture created in the first chamber is introduced into the second chamber through the third vent opening. Therefore, the fluid in the second chamber can be burnt or expanded with the simple structure. Further, the fluid in the second chamber is discharged later than that within the first chamber and thus, the fluid can reliably be burnt or expanded.

According to claim 28, in addition to claim 27, the third vent opening is formed on the center axis of the second chamber. With this arrangement, the combustible fluid in the second chamber can be burnt or expanded at high speed, which makes it possible to speed up the pressure rise within the second chamber.

According to claim 29, in addition to claim 27, the third vent opening is formed at a location deviated from the center axis of the second chamber. With this arrangement, it is possible to retard the combustion speed or inflating speed of the combustible fluid in the second chamber, and to retard the pressure rise within the second chamber.

According to claim 30, in addition to claim 27, the longitudinal axis of the third vent opening is in parallel to the center axis of the second chamber. With this arrangement, it is possible to control the combustion speed of the combustible fluid in the second chamber or the pressure rise within the second chamber.

According to claim 31, in addition to claim 27, the longitudinal axis of the third vent opening is directed in a direction intersecting the center axis of the second chamber. With this arrangement, it is possible to control the combustion speed of the combustible fluid in the second chamber or the pressure rise within the second chamber in some degree.

According to claim 32, in addition to claim 27, the second chamber is formed into a cylindrical shape, and the longitudinal axis of the third vent opening is directed in a circumferential direction of the second chamber. With this arrangement, it is possible to control the combustion speed of the combustible fluid in the second chamber or the pressure rise within the second chamber in some degree.

According to claim 33, in addition to claim 27, the third vent opening is provided in plural, the axes of the third vent openings are regularly directed, or irregularly directed in multiple directions. With this arrangement, it is possible to variously control the combustion speed of the combustible fluid in the second chamber or the pressure rise within the second chamber.

According to claim 34, in addition to any one of claims 27 to 33, the gas generating apparatus further includes flow path deviating means for deviating a direction of the outflow of a fluid ejecting from the first chamber to the second chamber through the third vent opening. With this arrangement, it is possible to control the combustion speed of the combustible fluid in the second chamber or the pressure rise within the second chamber.

According to claim 35, in addition to claim 34, the flow path deviating means is selected from at least one of a projection, a plate, a mesh and a metal wire provided in the first chamber and/or the second chamber. With this arrangement, it is possible to control the combustion speed of the combustible fluid in the second chamber or the pressure rise within the second chamber.

According to claim 36, in addition to any one of claims 27 to 35, a sum of sectional areas of the third vent openings is set in a range of 0.10 $mm^2$ to 20 $mm^2$. With this arrangement, the combustion speed of the combustible fluid in the chamber can be controlled as effectively as possible.

According to claim 37, in addition to any one of claims 27 to 36, a length of the third vent opening is set in a range of 0.2 mm to 100 mm. With this arrangement, the combustion speed of the combustible fluid in the chamber can be controlled as effectively as possible.

According to claim 38, in addition to 27, the gas generating apparatus further includes combustion gas cooling means for cooling a fluid ejected from the first chamber to the second chamber through the third vent opening. With this arrangement, it is possible to control the combustion speed of the combustible fluid in the second chamber or the pressure rise within the second chamber, and to lower the temperature of the combustion fluid mixture.

According to claim 39, in addition to claim 38, the combustion gas cooling means is selected from at least one of a projection, a plate, a mesh and a metal wire provided in the first chamber and/or the second chamber. With this arrangement, it is possible to control the combustion speed of the combustible fluid in the second chamber or the pressure rise within the second chamber, and to effectively lower the temperature of the combustion fluid mixture.

According to claim 40, in addition to any one of claims 27 to 39, the second vent opening is set to be opened when a predetermined time period is elapsed after the ignition means operates. With this arrangement, it is possible to swiftly introduce the gas into the air bag.

According to claim 41, in addition to claim 40, the second occluding member is broken when a pressure within the first chamber reaches a predetermined value. With this arrangement, it is possible to swiftly start introducing the fluid into the air bag.

According to claim 42, in addition to claim 40, the second occluding member is mechanically broken. With this arrangement, it is possible to swiftly start introducing the fluid into the air bag.

According to claim 43, there is provided a gas generating apparatus for an air bag apparatus, comprising: a first chamber accommodating a combustible fuel and having a first vent opening; and a second chamber having a second vent opening and a third vent opening; wherein a portion of combustion product created in the first chamber is passed through the third vent opening and introduced into the second chamber, a combustion product created in the second chamber is introduced from the second vent opening into the first chamber, and the combustion products created in the first and second chambers are discharged from the first vent opening.

With this arrangement, the chamber accommodating the combustible fluid is divided into the first and the second chambers, and the combustion product is created in the first chamber having the first vent opening which is in communication with the air bag. Therefore, it is possible to swiftly break the first occluding member, and to swiftly discharge the combustion product within this first chamber. As a result, it is possible to shorten the initial responding time period in which the air bag starts inflating. Further, a portion of the combustion product created in the first chamber is introduced from the third vent opening into the second chamber. Therefore, the fluid in the second chamber can be burnt with the simple structure. Furthermore, the fluid in the second chamber is discharged later than that within the first chamber, the fluid can reliably be burnt.

According to claim 44, there is provided a gas generating apparatus for an air bag apparatus, comprising: at least two chambers capable of communicating with each other; and a fluid accommodated in each of the chambers; wherein the fluid accommodated in at least one of the chambers is combustible fluid, one of the two chambers ignites the combustible fluid, and both the fluids are discharged from the chamber which ignites the combustible fluid. With this arrangement, the fluid can swiftly be introduced into the air bag.

According to claim 45, there is provided an inflating method of an air bag comprising a first chamber and a second chamber for burning a combustible fluid accommodated in at least the first chamber to inflate the air bag by a fluid mixture whose pressure is increased by a rise in temperature due to the combustion, the method comprising the steps of: igniting the combustible fluid in the first chamber; introducing, into the second chamber, at least a portion of a combustion fluid mixture created in the igniting step; introducing, into the air bag, at least a portion of the combustion fluid mixture generated in the igniting step; and introducing at least a portion of the combustion fluid mixture within the second chamber from the second chamber through the first chamber into the air bag. With this method, the fluid can swiftly be introduced into the air bag.

BEST MODE FOR CARRYING OUT THE INVENTION (First Embodiment)

Figure 1:
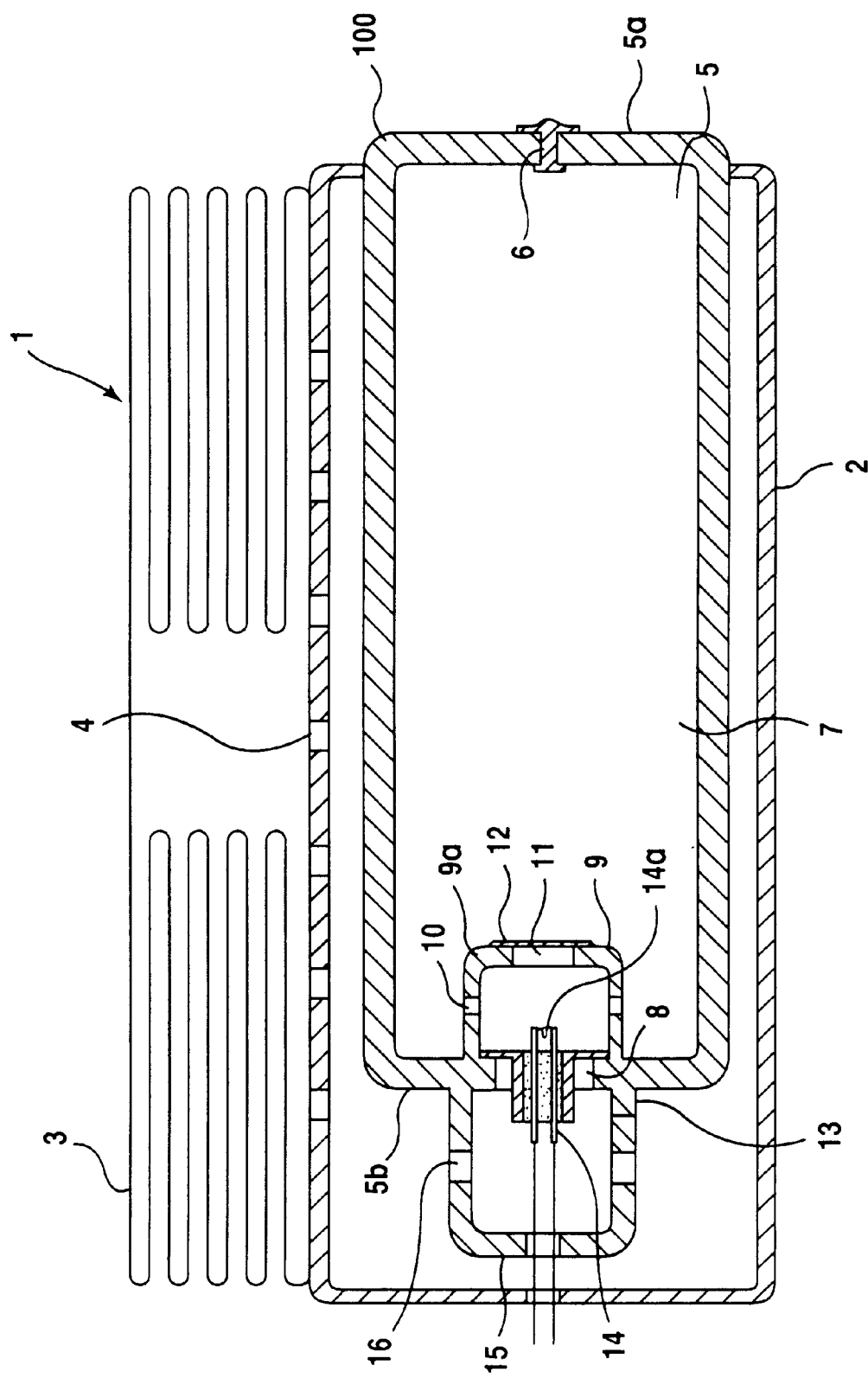
FIG. 1 is a sectional view of an air bag apparatus according to a first embodiment.

A first embodiment of the present invention will be explained with reference to the drawings. FIG. 1 shows an arrangement of an air bag apparatus according to the first embodiment of the invention. In FIG. 1, a reference numeral 1 denotes the entire air bag apparatus. A reference numeral 2 denotes a bottomed square cylindrical module case forming an outline of the air bag apparatus 1. An air bag 3 is mounted to the module case 2 which includes a plurality of fluid supply holes 4. The air bag 3 is folded in a normal condition. A gas generating apparatus 100 for the air bag apparatus is inserted in the module case 2 such as to sealingly close the latter. The gas generating apparatus 100 for the air bag apparatus includes a second chamber 5 forming a pressure container which accommodates a combustible fluid mixture 7. The second chamber 5 is provided at its one end 5a with a fluid charging opening 6 for charging the combustible fluid mixture 7. The fluid charging opening 6 is sealed after the charging of the fluid. A reference numeral 8 denotes a first vent opening formed in the other end 5b of the second chamber 5. A reference numeral 9 denotes a first chamber mounted to the inner side of the other end 5b of the second chamber 5 by means of welding, screw or the like such as to surround the first vent opening 8. The first chamber 9 and the second chamber 5 are partitioned by a partition wall 9a. The partition wall 9a includes a third vent opening 10 which comprises a plurality of vent openings and a second vent opening 11. The first vent opening 8 is occluded by a first occluding member 13, and the second vent opening 11 is occluded by a second occluding member 12. An ignition 14 is provided such that its igniting portion 14a is located within the first chamber 9. In the present embodiment, the ignition 14 and the first occluding member 13 may be separate parts. A destruction pressure of the first occluding member 13 is set such that the latter is destroyed or broken when a pressure within the first chamber 9 reaches twice as high as the initial pressure. The ignition 14 ignites the combustible fluid mixture within the first chamber 9 upon reception of signal from a shock sensor or a deceleration sensor both of which are not shown. A diffuser 15 is mounted at the out side of the other end 5b of the second chamber 5 such as to surround the first vent opening 8, and is provided with a plurality of fluid diffusing holes 16. Here, means for igniting the combustible fluid mixture within the first chamber 9 may be a squib.

As the combustible fluid mixture 7, a mixture including an inert fluid, a combustible fluid and an oxidizer fluid is used. A preferable inert fluid is nitrogen, argon, helium or a mixture thereof. The combustible fluid may be hydrogen, lower hydrocarbon, lower alcohol, lower ether or a mixture thereof. A preferable oxidizer fluid is oxygen. Air may be used as a mixture of the inert fluid and oxidizer fluid. As the combustible fluid mixture 7, a mixed fluid may be used which does not include an inert fluid, but includes a small amount of combustible fluid and oxidizer fluid in an amount sufficiently greater than necessary for burning the combustible fluid. Further, the combustible fluid mixture 7 may be comprised of a composition that is brought into a combustible range just before or simultaneously with the igniting of the combustible fluid. In this case, just before or simultaneously with the ignition of the combustible fluid, the oxidizer fluid or a mixture of the oxidizer fluid and the inert fluid is mixed with the combustible fluid.

Further, the combustible fluid mixture 7 may be a gas mixture or a liquid mixture. In the embodiments of the present invention, it is described that the combustible fluid mixture is accommodated in both the first and the second chambers, but a fluid mixture accommodated in one of the chambers which is not ignited may not necessarily be the combustible fluid mixture. In that case, such a fluid mixture may not include a combustible fluid, or even if the fluid mixture includes the combustible fluid, the amount thereof is small such that the concentration thereof is equal to or less than the combustion limit. In this case, in order to prevent the fluid in each of the chambers from being mixed with each other, an occluding member is mounted also to the third vent opening. As means for breaking the occluding member provided to the third vent opening, any known means including mechanical breaking means such as a piston and the like, and means utilizing a pressure difference may be used.

Next, an operation in the above described first embodiment will be explained. In the drawings, it should be noted that any part denoted by the same indicates the same element. When a vehicle is rapidly decelerated due to a collision or the like, the ignition 14 ignites the combustible fluid mixture 7 within the first chamber 9 by the signal from the shock sensor or the deceleration sensor. By this, the combustible fluid mixture within the first chamber 9 is burnt, the temperature of the fluid rises due to such burning and as a result, the pressure within the first chamber 9 is increased. When the pressure within the first chamber 9 reaches twice as high as the initial pressure, a fragile portion of the first occluding member 13 is broken, and the combustion fluid mixture is introduced from the first chamber 9 through the first vent opening 8, the diffuser 15, the module case 2 into the air bag 3. Here, the term "combustion fluid mixture" means a fluid mixture which is created by burning the combustible fluid mixture 7.

During that time, at least a portion of the combustion fluid mixture within the first chamber 9 is passed through the third vent opening 10 and introduced into the second chamber 5 to start burning the combustible fluid mixture 7 within the second chamber 5. On the other hand, the pressure within the first chamber 9 is rapidly decreased because the combustion fluid mixture flows out due to the destruction of the first occluding member 13. For this reason, the pressure difference between the second chamber 5 and the first chamber 9 becomes large. If the pressure difference reaches a predetermined value, the fragile portion of the second occluding member 12 is broken. By this, the combustion fluid mixture within the second chamber 5 is passed through the second vent opening 11, and introduced into the air bag through the first chamber 9, the diffuser 15 and the module case 2. The pressure within the second chamber 5 is once decreased because the combustion fluid mixture flows out from the second vent opening 11. However, because the combustible fluid which was not yet burnt within the second chamber 5 is subsequently burnt, the pressure within the second chamber 5 is balanced or slightly increased to supply the combustion fluid mixture to the air bag 3 until the combustible fluid in the second chamber 5 is completely burnt.

If it is desired to speed up the combustion within the second chamber 5, the second occluding member 12 may be set to be broken in a condition in which a pressure within the first chamber 9 is higher than a pressure within the second chamber 5. That is, the second occluding member 12 may be broken before or simultaneously with destruction of the first occluding member 13. The second occluding member 12 may be broken by utilizing a pressure difference between the first and the second chambers, or may be mechanically broken upon reception of a signal from an external sensor (not shown).

Figure 2:
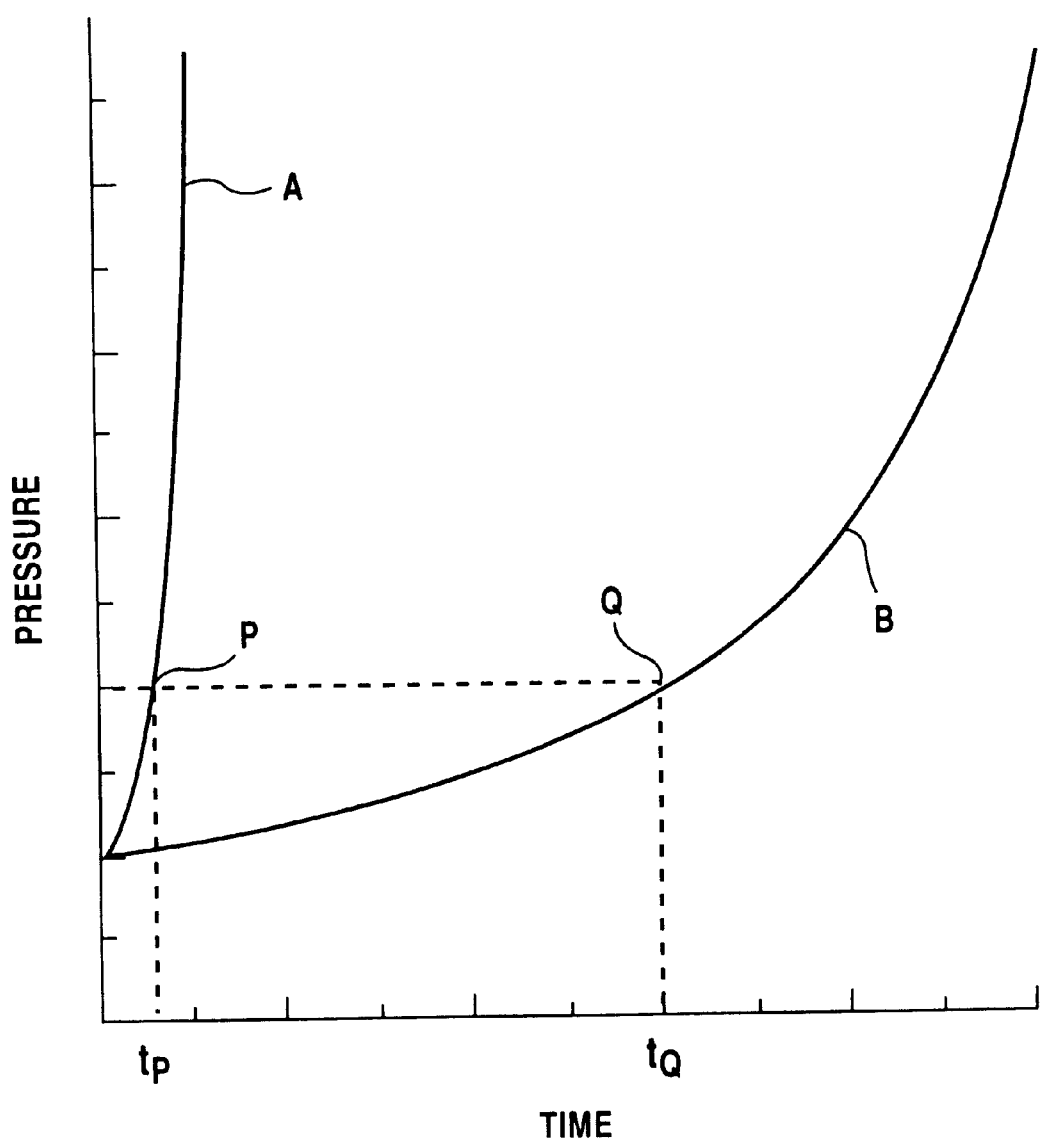
FIG. 2 is a graph showing a relation between a fluid pressure and time in a condition in which a first chamber and a second chamber are independent from each other according to the first embodiment.

FIG. 2 shows modification in pressure rise as time passes within the first chamber 9 and the second chamber 5 according to the first embodiment. In FIG. 2, a curve A indicates a pressure rise within the first chamber 9, and a curve B indicates a pressure rise within the second chamber 5. The pressure rise in the first and the second chambers 9 and 5 shown in FIG. 2 was measured independently in a condition that both the first occluding member 13 and the second occluding member 12 were set not to be broken and a volume of the first chamber is set substantially one tenth of a volume of the second chamber 5. As is apparent from comparison between the point P and the point Q in FIG. 2, time required to reach the predetermined destruction pressure in the first chamber 9 having a small volume than the second chamber 5 is shorter, by (tQ-tP), than time required to reach the predetermined destruction pressure in the second chamber 5.

Figure 3:
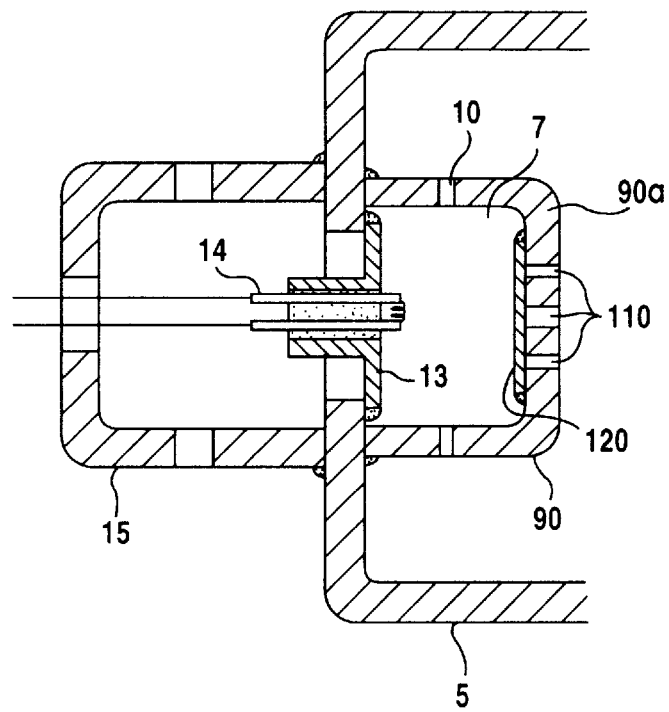
FIG. 3 is a partial sectional view showing a modification of the first chamber and a second occluding member according to the first embodiment.

FIG. 3 shows a modification of the first chamber 9 and the second occluding member 12 according to the first embodiment. A second occluding member 120 is provided to a partition wall 90a of a first chamber 90 at the inner side and is joined (not shown) with the partition wall 90a at an outer peripheral portion of the second occluding member 120. A second vent opening 110 of the partition wall 90a is composed of a plurality of openings of small diameter. That is, when a pressure within the first chamber 90 is higher than a pressure within the second chamber 5, the pressure is received by the second vent opening 110 having small diameter and therefore, a destructive pressure of the second occluding member 120 can be set higher. To the contrary, when the pressure within the second chamber 5 is higher than that within the first chamber 90, the pressure is received by the opening having large diameter and therefore, the destructive pressure of the second occluding member 120 can be set lower. Other arrangements are the same as those shown in FIG. 1.

In FIG. 3, when the combustible fluid mixture 7 within the first chamber 90 is ignited by the ignition 14, the pressure within the first chamber 90 is increased. At that time, because the second occluding member 120 receives the pressure by the second vent opening having small diameter, the second occluding member 120 is not broken by the pressure within the second chamber which pressure is lower than that within the first chamber 90. On the other hand, if the first occluding member 13 is broken by the pressure increase within the first chamber 90, the pressure within the first chamber 90 is rapidly decreased. Therefore, the second occluding member 120 receives pressure from the second vent opening 110 and hence, the second occluding member 120 is easily broken. As described above, according to the arrangement shown in FIG. 3, it is possible to break the second occluding member 120 simultaneously with or just after the destruction of the first occluding member 13, and to swiftly introduce the combustion fluid mixture within the second chamber 5 into the air bag.

Figure 4:
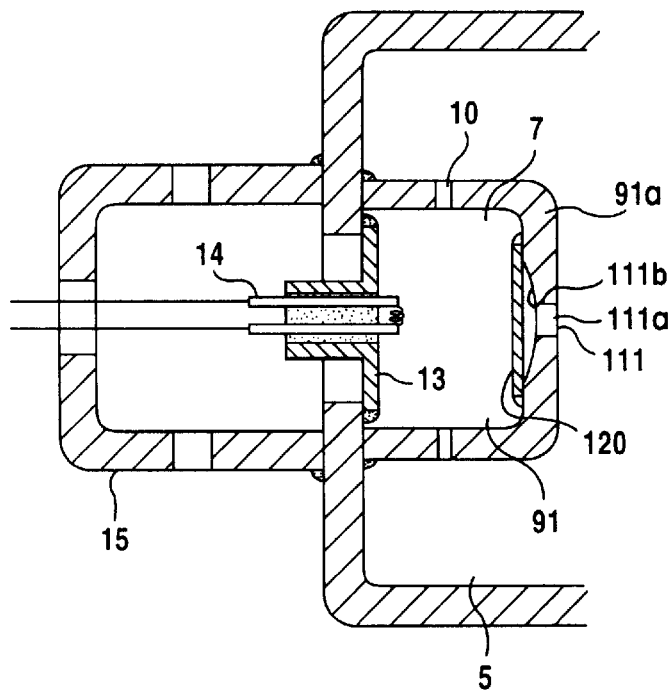
FIG. 4 is a partial sectional view showing another modification of the first chamber and the second occluding member according to the first embodiment.

FIG. 4 shows a further modification of the first chamber 9 and the second occluding member 12. In FIG. 4, a first chamber 91 is formed by a partition wall 91a. The partition wall 91a is provided with a second vent opening 111 which comprises an opening 111a having a small diameter formed at an outer side of the partition wall 91a and a sphere portion 111b having large diameter formed at an inner side of the partition wall 91a. A second occluding member 120 is joined with the partition wall 91a such as to cover the sphere portion 111b. Other arrangements are the same as those shown in FIG. 1.

In FIG. 4, when the combustible fluid mixture 7 within the first chamber 91 is ignited by the ignition 14, the pressure within the first chamber 91 is increased. At that time, because the second occluding member 120 is pushed against the sphere portion 111b, the second occluding member 120 is not broken. When the first occluding member 13 is broken by pressure increase within the first chamber 91, the pressure within the first chamber 91 is rapidly decreased. Therefore, the pressure within the second chamber 5 is increased relative to the pressure within the first chamber 91 and the second occluding member 120 receives pressure from the side of the sphere portion 111b and hence, the second occluding member 120 is easily broken. As described, according to the arrangement shown in FIG. 4, it is possible to break the second occluding member 120 simultaneously with or just after the destruction of the first occluding member 13. Further, it is possible to swiftly introduce the combustion fluid mixture within the second chamber 5 into the air bag.

Figure 5A:
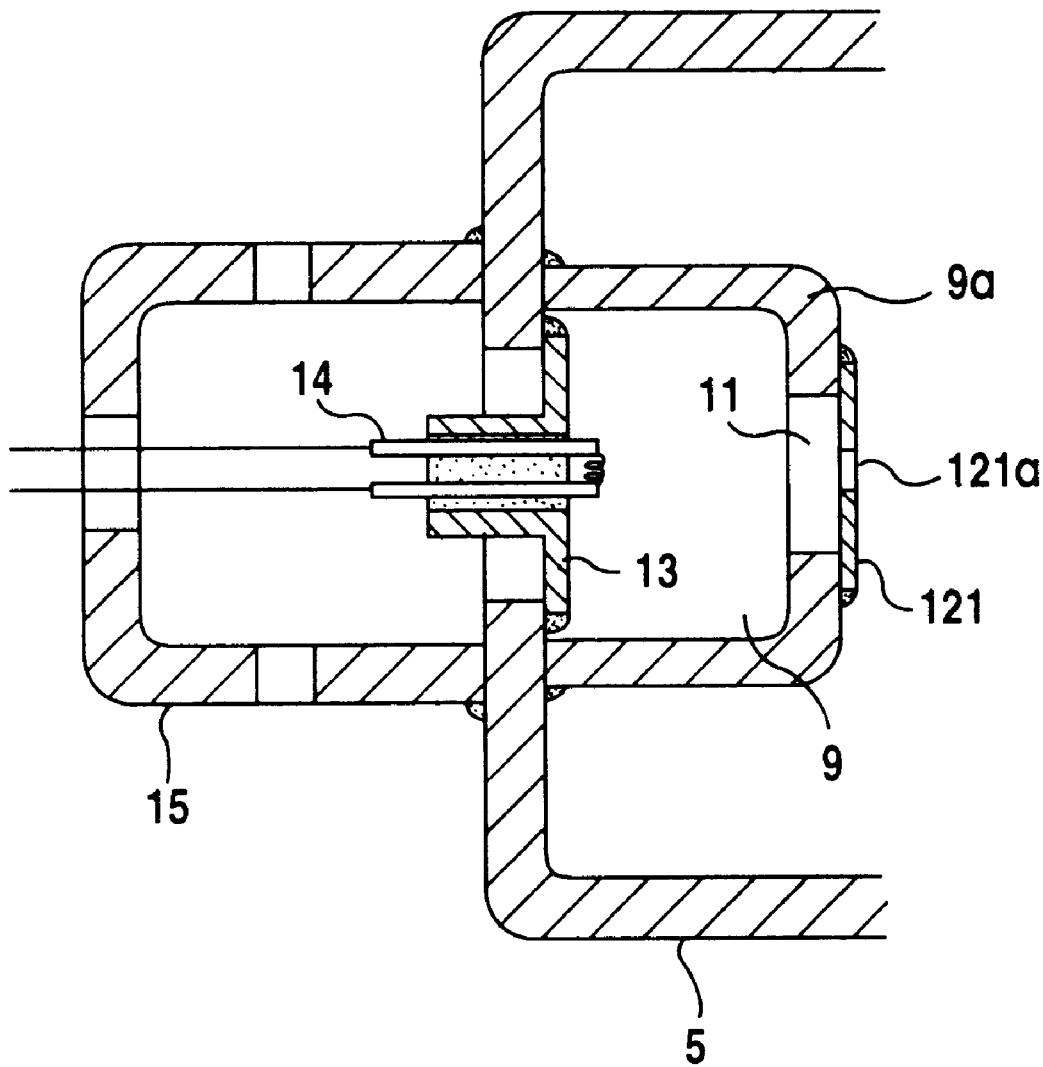
FIG. 5 is a partial sectional view showing another modification of the first chamber and the second occluding member according to the first embodiment.
Figure 5B:
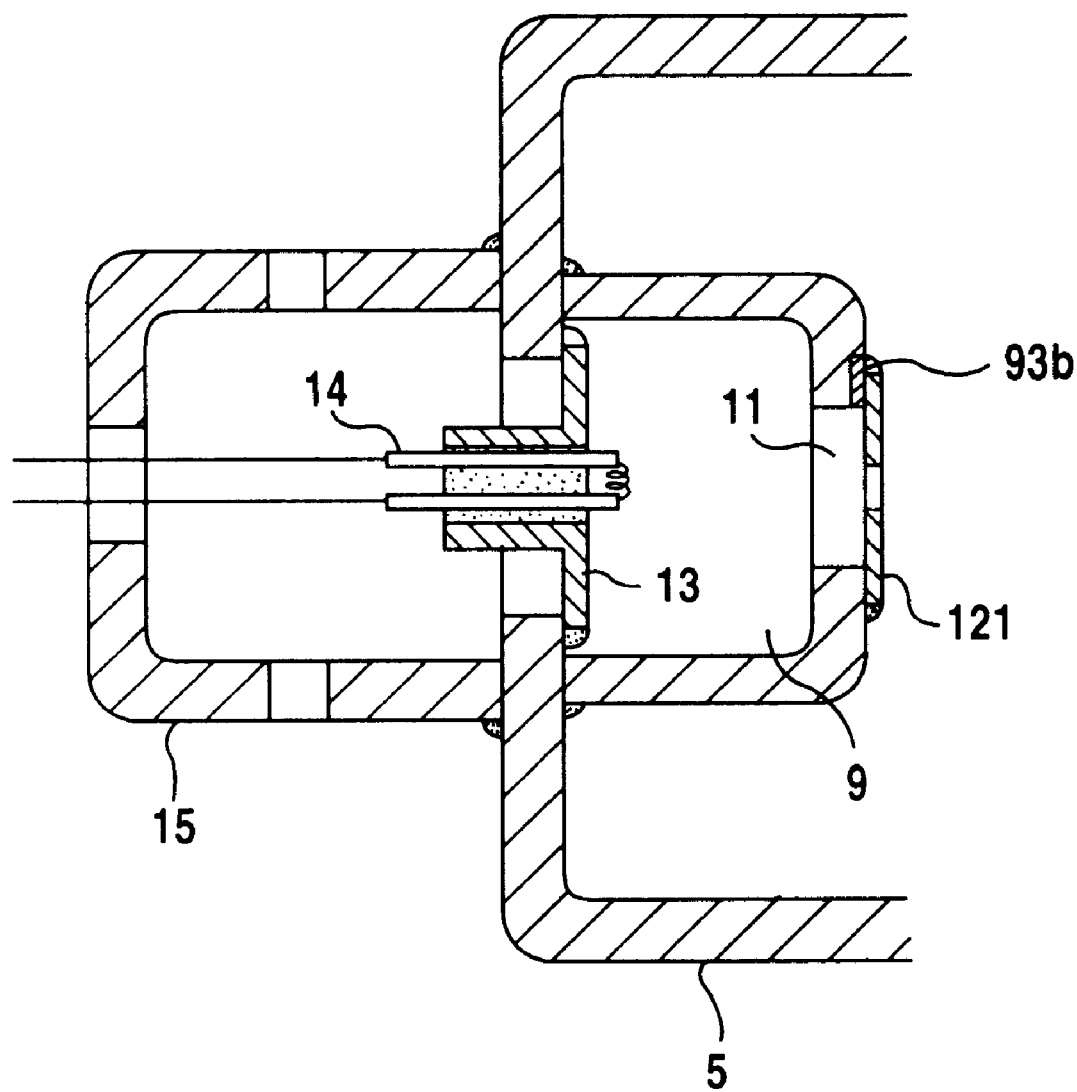

FIG. 5 shows a further modification of the first chamber 9 and the second occluding member 12 of the first embodiment. A second occluding member 121 is joined with the first chamber 9 such as to occlude the second vent opening 11, and is formed at its central portion with an opening 121a having small diameter. Other arrangements are the same as those shown in FIG. 1. The arrangement shown in FIG. 5 performs the same operation and provides the same effect as the arrangement shown in FIG. 1 does, except that the opening 121a having small diameter formed in the second occluding member 121 functions as the third vent opening 10.

In the present modification, instead of providing the third vent opening, the opening 121a is provided in the second occluding member 121. But instead of providing the opening 121a, a clearance may be formed, as the third vent opening, in a portion of a joint between the second occluding member 121 and the partition wall 9a.

In the above described first embodiment, by igniting in the first chamber which is substantially closed which is smaller than the second chamber, the combustion speed is speeded up, the first occluding member is broken swiftly, and the initial responding time period in which the air bag starts inflating is shortened. However, by providing a convex portion on an inner wall surface in the vicinity of the igniting portion 14a of the first chamber, it is possible to further speed up the initial responding speed.

(Second Embodiment)

Figure 6:
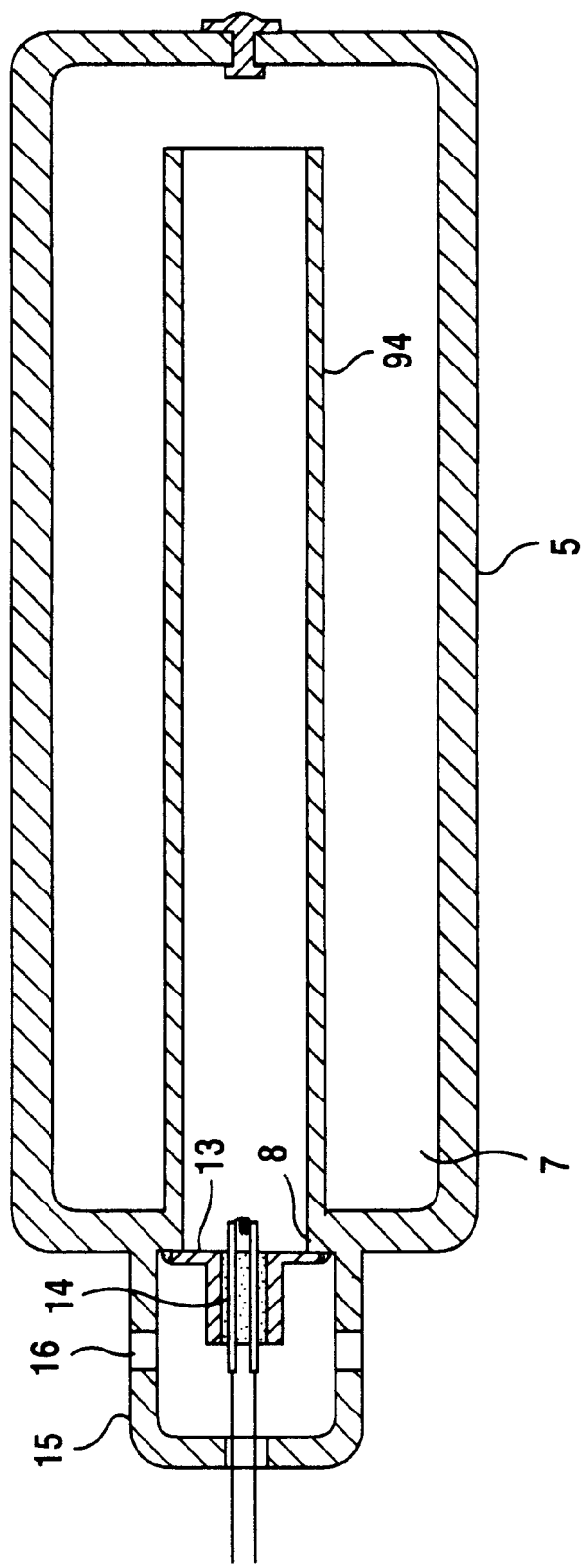
FIG. 6 is a partial sectional view of a gas generating apparatus for an air bag apparatus according to a second embodiment of the invention.

Next, a second embodiment of the present invention will be explained. FIG. 6 shows an arrangement of a gas generating apparatus for an air bag apparatus in the second embodiment. In the second embodiment, unlike the first embodiment, a first chamber 94 is long, narrow cylindrical shaped, that end portion of the first chamber 94 which is opposite from the first vent opening 8 is not provided with the second occluding member, but is opened, and the first occluding member 13 is joined with the outside of the first vent opening 8. Other arrangements are the same as those in the first embodiment shown in FIG. 1.

In FIG. 6, when the combustible fluid mixture 7 within the first chamber 94 is ignited by the ignition 14 and is burnt, combustion fluid mixture within the first chamber 94 ignites, at its opened end, the combustible fluid mixture 7 within the second chamber 5. The pressure within the first chamber 94 rises to break the first occluding member 13, and the combustion fluid mixture in the first chamber 94, and then the combustion fluid mixture in the second chamber 5 are introduced into the air bag from the first vent opening 8 through the fluid diffusing holes 16 of the diffuser 15.

In this manner, even if there is no second occluding member, according to the second embodiment also, the same effect as the first chamber 9 in the first embodiment can be obtained by forming the first chamber 94 into a long, narrow cylindrical shape.

In the second embodiment, by setting a length and a diameter of the first chamber 94 to certain values, it is possible to vary the timing for breaking the first occluding member 13, and the timing for introducing the combustion fluid mixture into the second chamber 5.

In both the first and the second embodiments, it is preferable to provide means for confining the broken first occluding member 13, or means for holding the broken first occluding member 13.

FIGS. 7 to 16 show third to ninth embodiments. These embodiments include structures for variously controlling the expanding characteristic of the air bag. In each of the third to ninth embodiments which will be described hereinafter, the basic arrangement is the same as that in the first embodiment, and the same reference numerals are allocated to the same parts.

(Third Embodiment)

Figure 7:
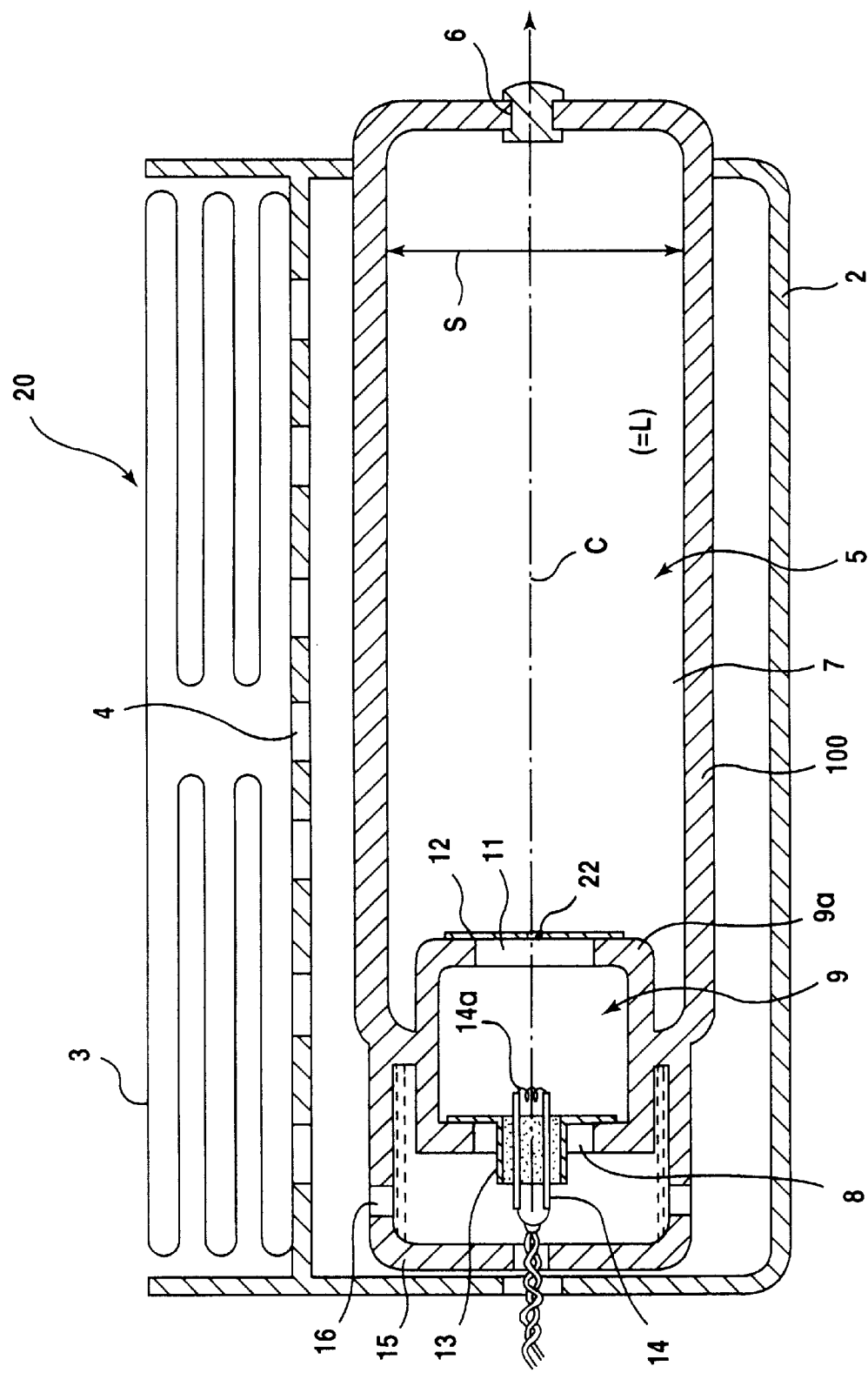
FIG. 7 is a sectional view of a gas generating apparatus for an air bag apparatus according to a third embodiment of the invention.

FIG. 7 shows an arrangement of an air bag according to the third embodiment. A reference numeral 20 denotes the entire air bag apparatus. The reference numeral 2 denotes a module case forming an outline of the air bag apparatus 20. An air bag is mounted to the module case 2 which is provided with a plurality of fluid supply holes 4. A reference numeral 100 denotes a gas generating apparatus for the air bag apparatus. A reference numeral 5 denotes a cylindrical second chamber. The second chamber 5 includes the center axis C, a long axis L and a short axis S. A reference numeral 6 denotes a fluid charging opening for charging the combustible fluid mixture 7 into the gas generating apparatus 100 for the air bag apparatus. The fluid charging opening 6 is occluded after charging of the combustible fluid mixture 7. A reference numeral 8 denotes a first vent opening. A reference numeral 9 denotes a first chamber provided at the opposite side of the fluid charging opening 6 of the second chamber 5. A reference numeral 11 denotes a second vent opening. A reference numeral 12 denotes a second occluding member mounted to the partition wall 9a such as to occlude the second vent opening 11. A reference numeral 13 denotes a first occluding member for occluding the first vent opening 8. The first occluding member 13 is integrally formed with the ignition 14. A reference numeral 14a denotes an igniting portion of the ignition 14, which igniting portion being located in the first chamber 9. It should be noted that the ignition 14 and the first occluding member 13 may be separate parts. Means for igniting the combustible fluid mixture 7 in the first chamber 9 may be squib.

In the third embodiment, the center of the second occluding member 12 is aligned with the center axis C of the second chamber, and a single third vent opening 22 is provided at the center of the second occluding member 12.

The second occluding member 12 is broken by difference between a pressure within the first chamber 9 and a pressure within the second chamber 5, simultaneously with or after opening of the first occluding member 13. Instead, the first occluding member 13 may be opened mechanically by a piston or the like after a predetermined time period is elapsed. Only the third vent opening 22 is in communication with the first chamber 9 and the second chamber 5 until the predetermined time period is elapsed. When the combustible fluid mixture 7 in the first chamber 9 is burnt, the first chamber 9 is substantially closed. The expression that the first chamber is "substantially closed" means that the first chamber is closed to such an extent that a pressure rise which is necessary to break the first occluding member 13 is not prevented. Therefore, the initial responding time period is not delayed. It should be noted that this fact is applied also to the fourth to fourteenth embodiments which will be described later.

As compared with the second vent opening 11, the third vent opening 22 has a smaller sectional area and/or a shorter length. Even if the third vent opening 22 is composed of a plurality of openings, it is preferable that a sum of sectional areas of the plurality of openings is smaller than a sectional area of the second vent opening.

It is preferable that the third vent opening 22 is set to have a sectional area in a range of 0.10 to 20 mm$^2$, and a length in a range of 0.2 to 100 mm. If the third vent opening 22 has a sectional area smaller than 0.10 mm$^2$ and a length longer than 100 mm, it is difficult to introduce the combustion fluid mixture generated in the first chamber 9 into the second chamber 5. On the other hand, if the third vent opening 22 has a sectional area greater than 20 mm$^2$, and a length shorter than 0.2 mm, an amount of the combustion fluid mixture ejected from the first chamber 9 into the second chamber 5 is excessively increased when the pressure within the first chamber 9 rises by operation of the gas generating apparatus. This is not preferable because the pressure within the first chamber 9 does not rise. In the third vent opening 22, when the sectional area thereof is large, the length is preferably long, and when the sectional area is small, the length is preferably short.

In such an arrangement, when the vehicle is rapidly decelerated due to the collision or the like, the ignition 14 ignites the combustible fluid mixture 7 within the first chamber 9 by the signal from the shock sensor or the deceleration sensor. A pressure within the first chamber 9 is increased by the heat generated due to a combustion of the combustible fluid mixture 7 so that the first occluding member 13 is broken. And the combustion fluid mixture is introduced from the first vent opening 8 into the air bag 3 through the diffuser 15 and the module case 2.

Meantime, at least a portion of the combustion fluid mixture within the first chamber 9 is introduced, from the third vent opening 22 provided on the center axis C and the long axis L of the second chamber 5, into the second chamber 5 toward the center axis C and the long axis L. The introduced combustion fluid mixture ignites the combustible fluid mixture within the second chamber 5. In this third embodiment, the combustion fluid mixture is swiftly and effectively spread into the second chamber 5 and thus, it is possible to swiftly burn the combustible fluid mixture 7 within the second chamber 5. Therefore, a time period required for completing the inflation of the air bag can be set short.

Here, if the axis of opening of the third vent opening 22 is in parallel with the center axis C, the axis should not necessarily be located on the center axis C.

In such a case, as compared with a case in which the third vent opening 22 lies on the center axis C of the second chamber 5, ejection of the combustion fluid mixture into the second chamber 5 is restrained and thus, the combustible fluid mixture 7 at the side of the second chamber 5 can be burnt retardingly. Therefore, a time period required for completing the inflation of the air bag can be set relatively long.

(Fourth Embodiment)

Figure 8:
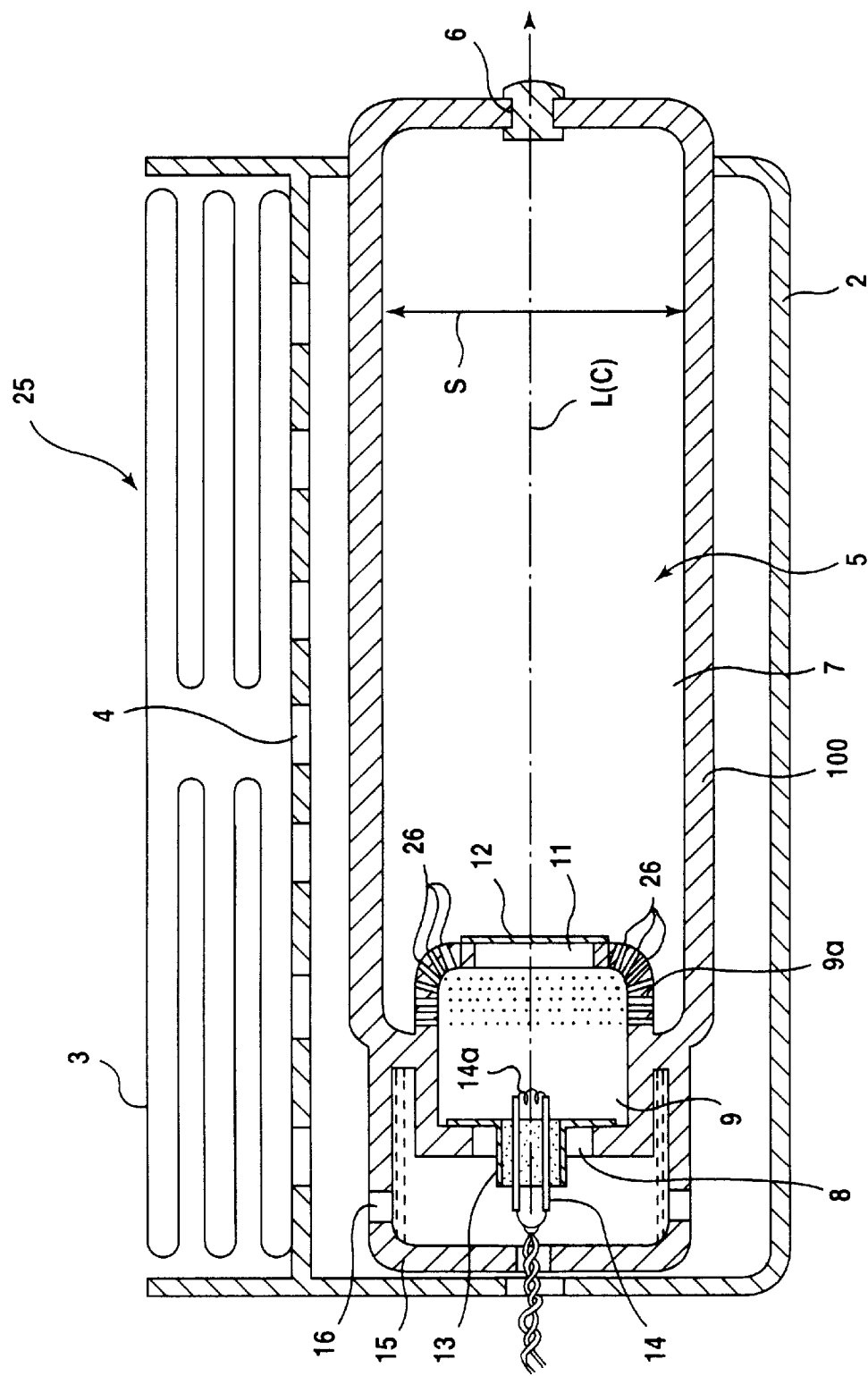
FIG. 8 is a sectional view of a gas generating apparatus for an air bag apparatus according to a fifth embodiment of the invention.

FIG. 8 shows an arrangement of an air bag apparatus according to the fourth embodiment. The same reference numerals are allocated to the same elements in the third embodiment. A reference numeral 25 denotes an air bag apparatus in the fourth embodiment.

In the fourth embodiment, the second vent opening 11 of the partition wall 9a is provided at its entire wall surface with a plurality of third vent openings 26 by a mechanical perforation. It is also possible to provide such third vent openings 26 by making, at least a portion of the partition wall 9a, of a porous material such as a sintered metal. The third vent openings 26 may be provided not only on the partition wall 9a, but also on the second occluding member 12.

In such an arrangement, when the vehicle is rapidly decelerated due to a collision or the like, the combustion fluid mixture is introduced from the first chamber 9 into the air bag 3 as in the third embodiment.

Meantime, at least a portion of the combustion fluid mixture within the first chamber 9 is ejected in a direction perpendicular to the center axis C of the second chamber 5 through the plurality of third vent openings 26. By such a combustion fluid mixture, the combustible fluid mixture 7 within the second chamber 5 starts burning. In the present embodiment, because spread of the combustion fluid mixture toward the center axis C is restrained, the combustible fluid mixture 7 at the side of the second chamber 5 can be burnt retardingly. Therefore, in this case, a time period required for completing the inflation of the air bag 3 can be set longer.

(Fifth Embodiment)

Figure 9:
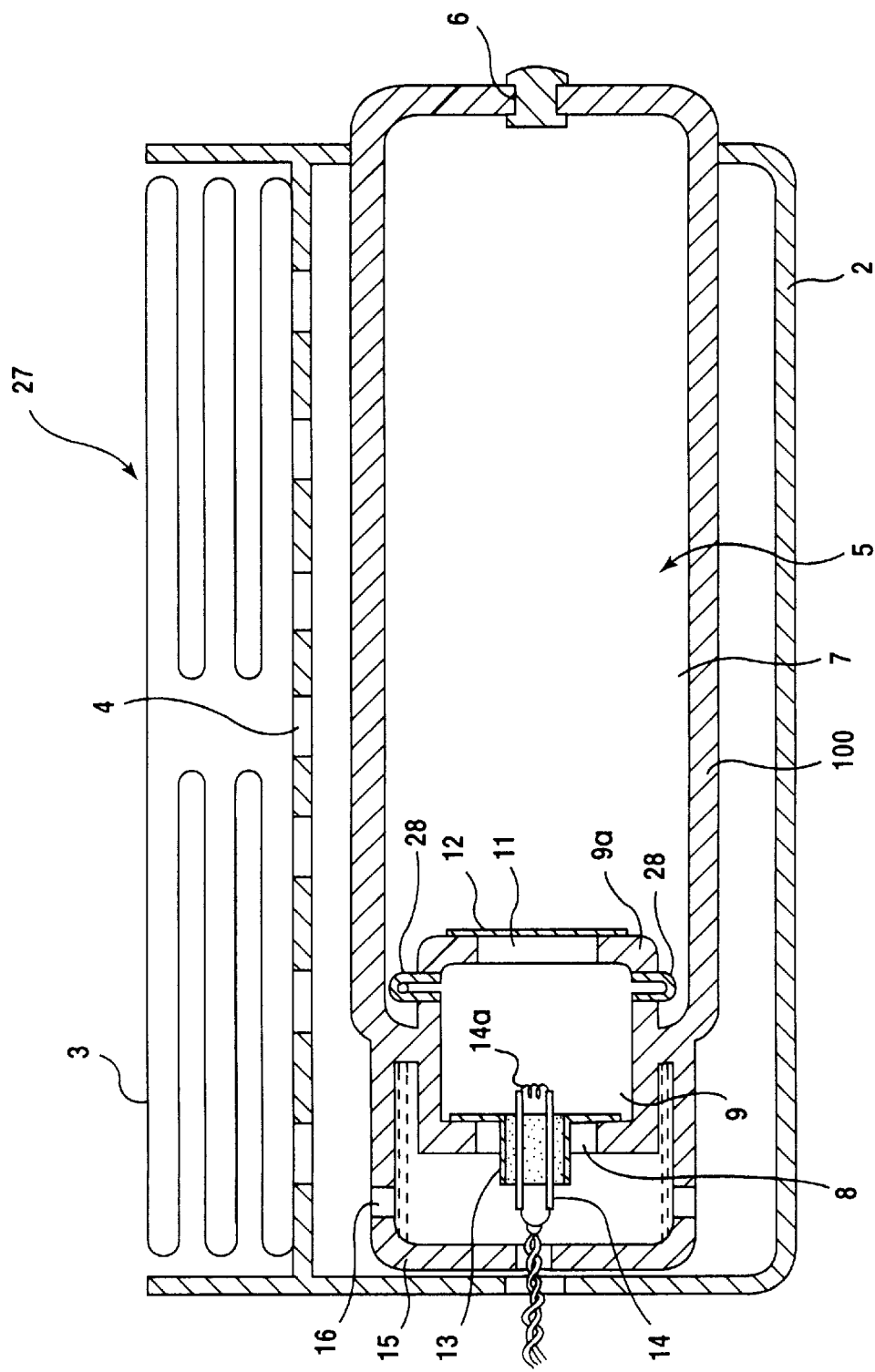
FIG. 9 is a sectional view of a gas generating apparatus for an air bag apparatus according to a sixth embodiment of the invention.

FIG. 9 shows an arrangement of an air bag apparatus according to the fifth embodiment. The same reference numerals are allocated to the same elements in the third embodiment. A reference numeral 27 denotes an air bag apparatus in the fifth embodiment.

Figure 10:
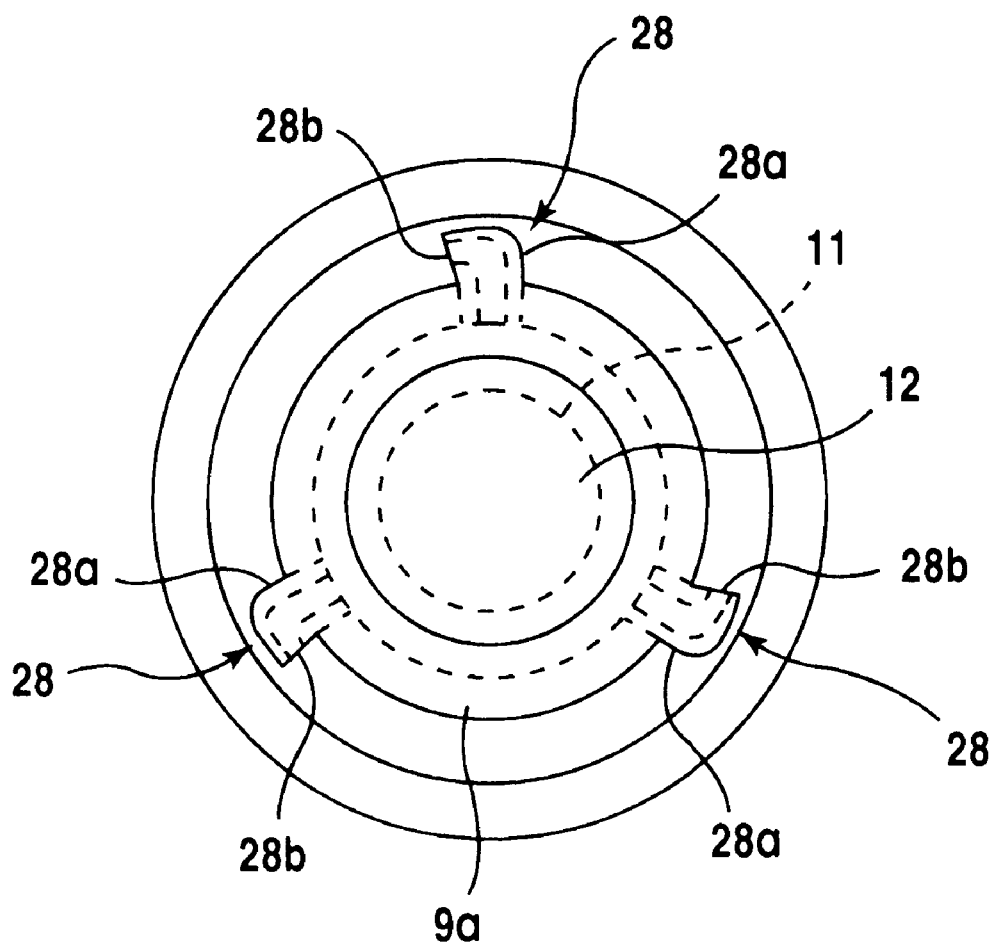
FIG. 10 is a front elevational view of a third vent opening of the gas generating apparatus for the air bag apparatus viewed from the side of the second occluding member.

According to this fifth embodiment, three vent tubes 28a as third vent opening 28 are provided at equal distances on the partition wall 9a such that leading end openings 28b of the vent tubes 28a are directed in a circumferential direction of the partition wall 9a, as is shown in FIG. 10.

In such an arrangement, when the vehicle is rapidly decelerated due to a collision or the like, the combustion fluid mixture is introduced from the first chamber 9 into the air bag 3.

Meantime, at least a portion of the combustion fluid mixture within the first chamber 9 is introduced into the cylindrical second chamber 5 in its circumferential direction through the third vent openings 28. In the present embodiment, because spread of the combustion fluid mixture toward the center axis C is restrained, the combustible fluid mixture 7 at the side of the second chamber 5 can be burnt retardingly. Therefore, in this case, a time period required for completing the inflation of the air bag 3 can be set longer.

It should be noted that the number of locations of the third vent openings 28 should not be limited to three, and they may be provided at any number of locations.

In the present embodiment, the vent tubes 28a are provided. However, such vent tubes 28a may be omitted by setting the third vent openings 28 such that axes of their openings eject the combustion fluid mixture in a circumferential direction.

(Sixth Embodiment)

Figure 11:
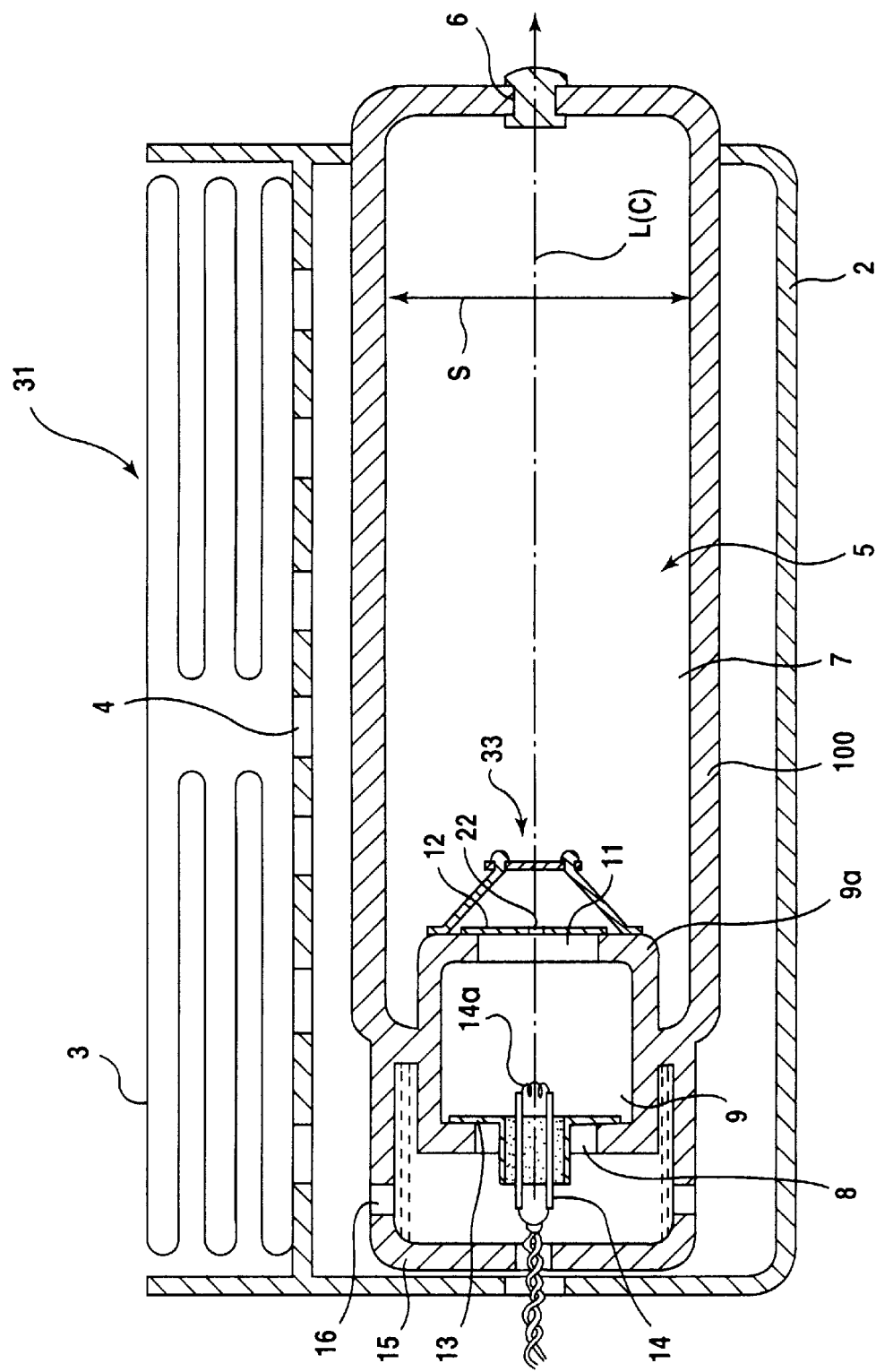
FIG. 11 is a sectional view of an air bag apparatus according to an eighth embodiment of the invention.

FIG. 11 shows an arrangement of an air bag apparatus according to the sixth embodiment. The same reference numerals are allocated to the same elements in the third embodiment. A reference numeral 31 denotes an air bag apparatus according to the sixth embodiment.

Figure 12:
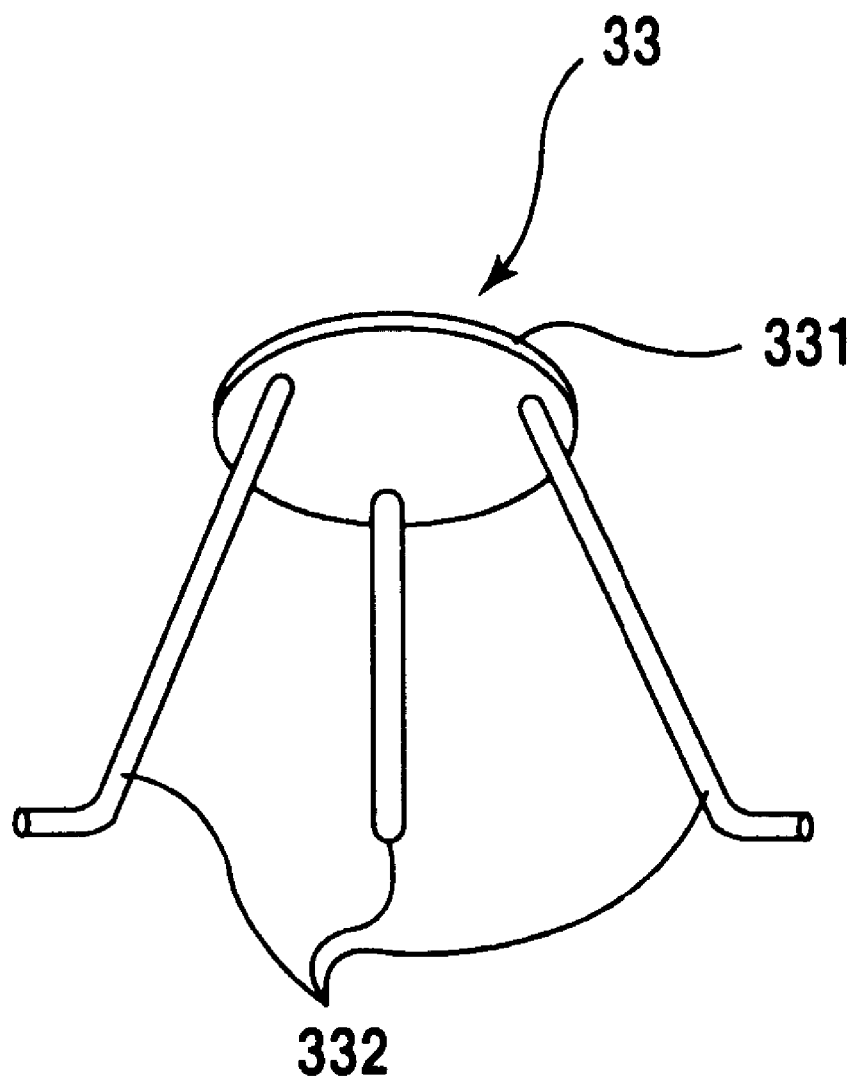
FIG. 12 is a perspective view of a flow path deviating means in the gas generating apparatus for the air bag apparatus.

In this embodiment, the second vent opening 11 is located on the long axis L and the center axis C of the second chamber 5. The third vent opening 22 is provided centrally to the second occluding member 12 which occludes the second vent opening 11. Here, a flow path deviating means 33 is disposed at the side of the second chamber 5 of the third vent opening 22. As is shown in FIG. 12, the flow path deviating means 33 comprises a circular metal plate 331 having smaller diameter than the second vent opening 11, and three leg members 332 disposed on one surface of the circular metal plate 331. The leg members 332 spread outward, and their end portions thereof are bent further outward in parallel to the circular metal plate 331. These leg members 332 are joined with the partition wall 9a astride the second occluding member 12.

In such an arrangement, when the vehicle is rapidly decelerated due to a collision or the like, the combustion fluid mixture is introduced from the first chamber 9 into the air bag 3 as shown in the third embodiment.

Meantime, at least a portion of the combustion fluid mixture within the first chamber 9 is introduced into the second chamber 5 through the third vent opening 22 which lies on the center axis C and the long axis L of the second chamber 5. The combustion fluid mixture is ejected toward the center axis C and the long axis L of the second chamber 5. The combustion fluid mixture collides against the circular metal plate 331 there, and the flowing path is deviated. That is, the combustion fluid mixture is guided toward the short axis S of the second chamber 5. In the present sixth embodiment, spreading of the combustion fluid mixture is restrained and thus, the combustible fluid mixture 7 at the side of the second chamber 5 can be burnt retardingly. Therefore, in this case, a time period required for completing the inflation of the air bag 3 can be set longer.

(Seventh Embodiment)

Figure 13:
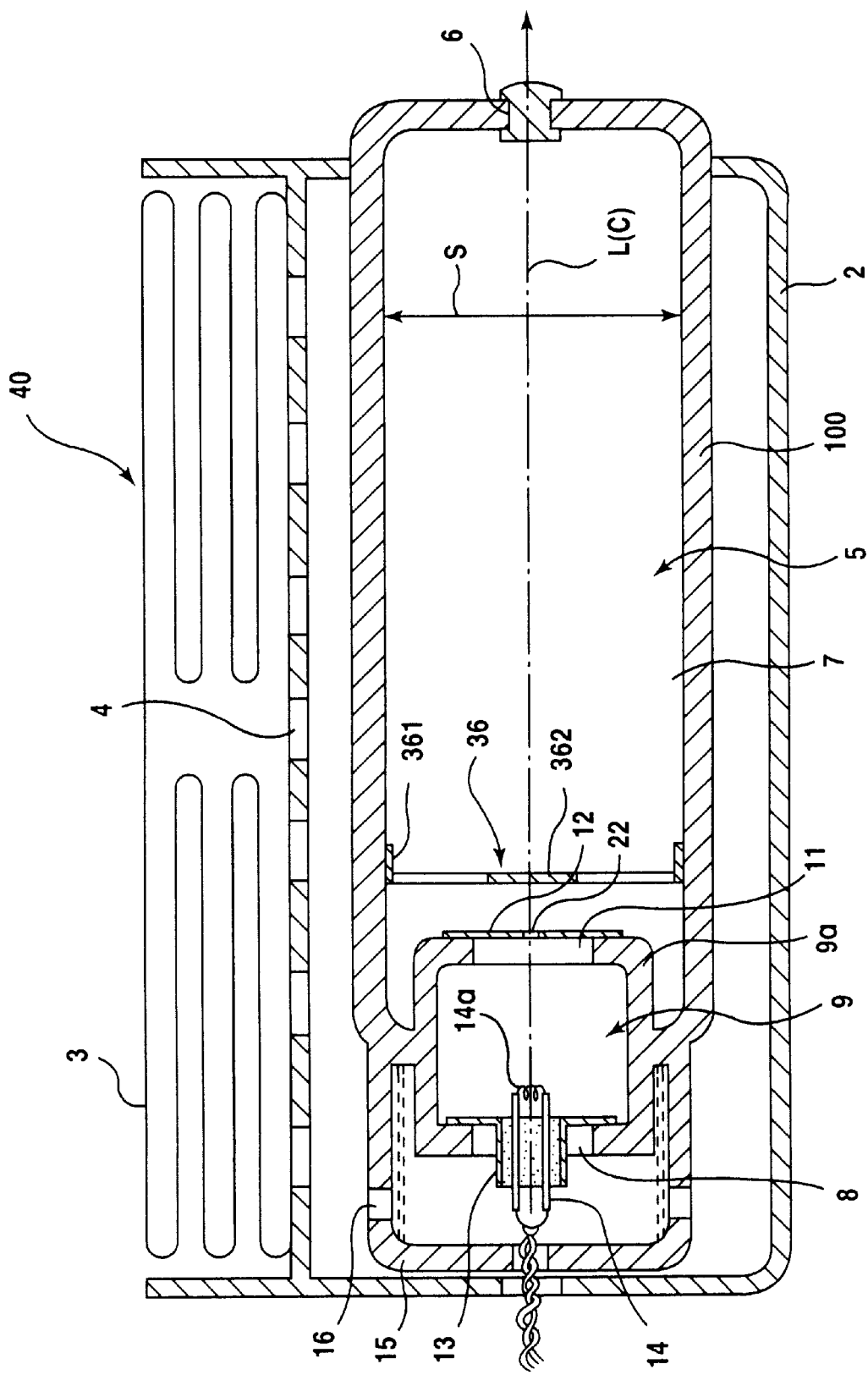
FIG. 13 is a sectional view of an air bag apparatus according to a ninth embodiment of the invention.

FIG. 13 shows an arrangement of an air bag apparatus according to the seventh embodiment of the invention. The same reference numerals are allocated to the same elements in the third embodiment. A reference numeral 40 denotes an air bag apparatus of the present embodiment.

Figure 14:
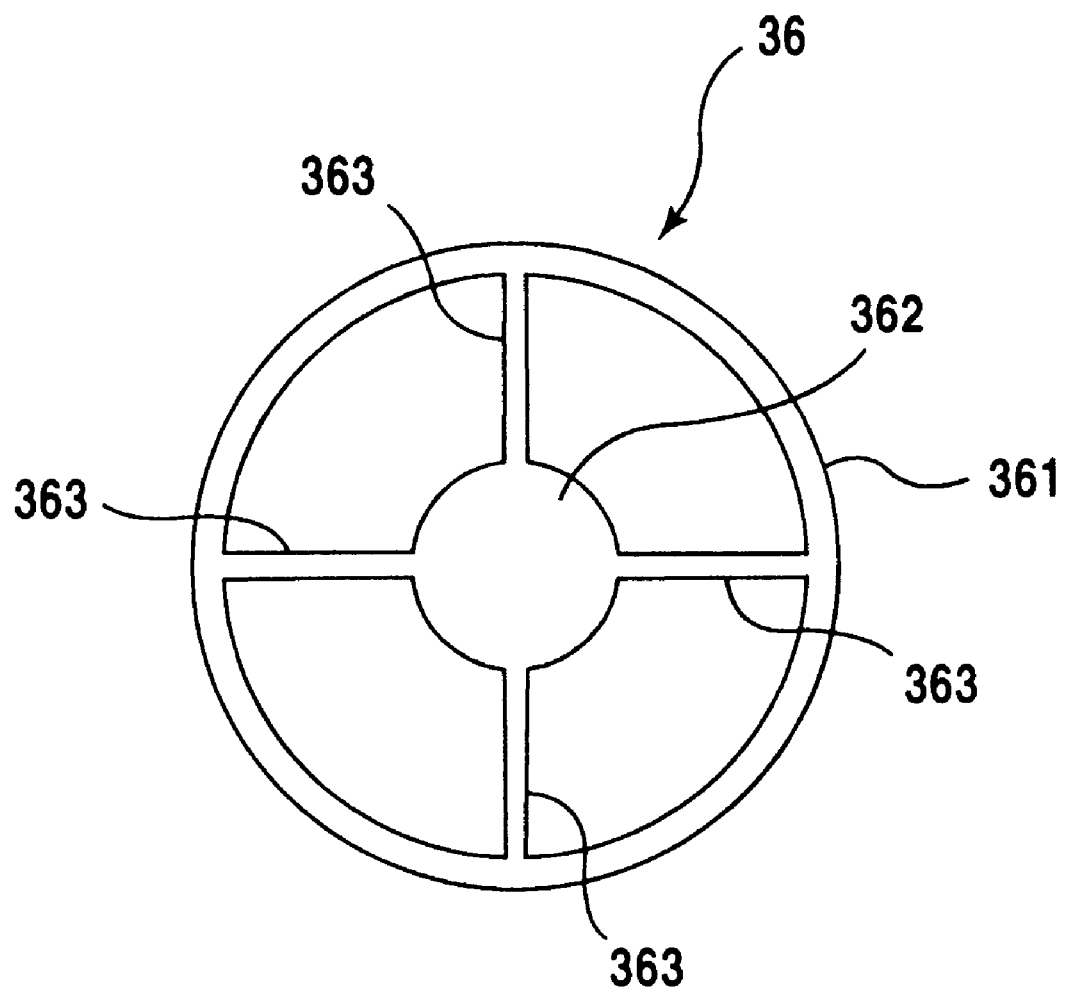
FIG. 14 is a front elevational view of a flow path deviating means in the gas generating apparatus for the air bag apparatus.

The center of the second occluding member 12 lies on the center axis C and the long axis L of the second chamber 5, and the third vent opening 22 is provided thereto. The flow path deviating means 36 is disposed near the third vent opening 22 at the side of the center of the second chamber 5. The flow path deviating means 36 comprises a ring member 361, a circular member 362 and an arm 363 as is shown in FIG. 14. The diameter of the ring member 361 is substantially the same length as the short axis S of the second chamber 5. The circular member 362 is connected to the center of the ring member 361 by four arms 363. The flow path deviating means 36 is disposed and joined in front of a top wall of the first chamber 9, and the circular member 362 is disposed such as to oppose to the third vent opening 22. It is preferable that the circular member 362 is smaller than the second vent opening 11.

In such an arrangement, when the vehicle is rapidly decelerated due to a collision or the like, the combustion fluid mixture within the first chamber 9 is introduced into the air bag 3 as in the third embodiment.

At least a portion of the combustion fluid mixture within the first chamber 9 is introduced into the second chamber 5 through the third vent opening 22 which lies on the center axis C and the long axis L of the second chamber 5. The combustion fluid mixture is ejected toward the center axis C of the second chamber 5, and collides against the circular member 362 of the flow path deviating means 36 so that the flow path is deviated. That is, the combustion fluid mixture is guided in a direction of the short axis S of the second chamber 5. In the present seventh embodiment, spreading of the combustion fluid mixture is restrained and thus, the combustible fluid mixture 7 in the side of the second chamber 5 can be burnt retardingly. Therefore, in this case, a time period required for completing the inflation of the air bag 3 can be set longer.

(Eighth Embodiment)

Figure 15:
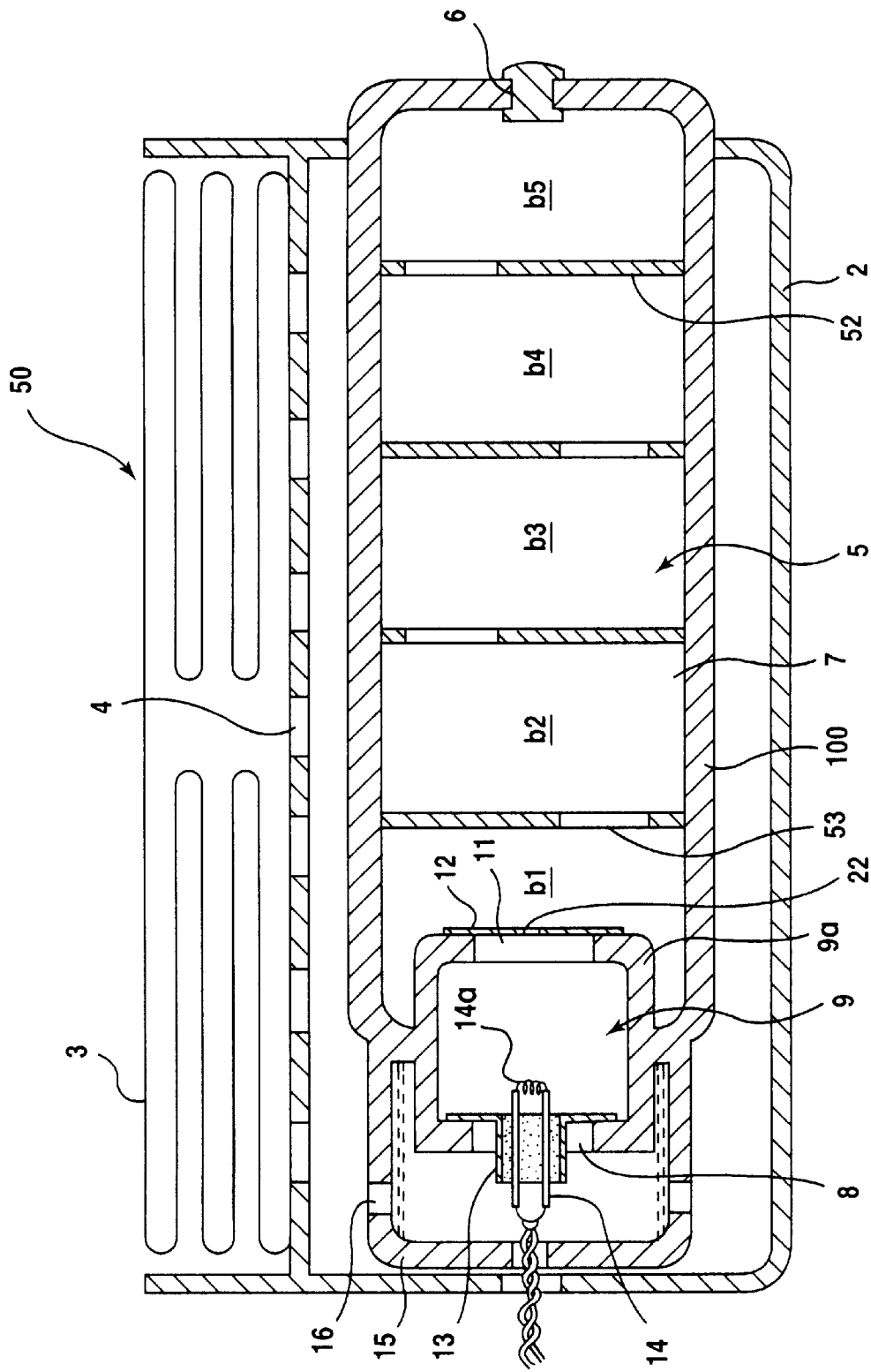
FIG. 15 is a sectional view of an air bag apparatus according to a tenth embodiment of the invention.

FIG. 15 shows an arrangement of an air bag apparatus according to the eighth embodiment of the invention. The same reference numerals are allocated to the same elements in the third embodiment. A reference numeral 50 denotes an air bag apparatus of the present embodiment.

In this embodiment, a plurality of partition plates 52 which function as flow path deviating means are disposed within the second chamber 5 at a constant distance from one another in the direction of the long axis L of the second chamber 5. The partition plates 52 partition the second chamber 5 into a plurality combustion blocks b1, b2, b3, b4 and b5. The partition plates 52 are formed with communication holes 53 for bringing the combustion blocks b1 to b5 into communication with one another. The communication holes 53 are formed such as to offset in a circumferential direction from the center of the partition plates 52, and the adjacent communication holes 53 are also offset from each other.

In such an arrangement, when the vehicle is rapidly decelerated due to a collision or the like, the combustion fluid mixture is introduced from the first chamber 9 into the air bag 3.

Meantime, at least a portion of the combustion fluid mixture is introduced into the second chamber S through the third vent opening 22. The combustion fluid mixture ignites the combustible fluid mixture within the second chamber 5. In the present embodiment, the second chamber 5 is partitioned into the plurality of combustion blocks b1 to b5 by the plurality of partition plates 52. Further, the combustion blocks b1 to b5 are in communication in a zigzag manner by the communication holes 53. Therefore, the flow path within the second chamber 5 is deviated and as a result, the length of the flow path within the second chamber 5 is substantially increased. Consequently, a time period required for burning the combustible fluid mixture within the second chamber 5 is elongated. Further, the partition plates 52 can also function as cooling members for the combustion fluid mixture which cool the high-temperature combustion fluid mixture ejected from the first chamber into the second chamber.

At least two of the communication holes 53 may be arranged on the same straight line. Further, such communication holes 53 arranged on the same straight line may also be arranged on the center axis C of the second chamber 5. In these cases, the time period required for burning the combustible fluid mixture within the second chamber 5 can be shortened in this order.

Also, at least one of the partition plates 52 may be formed with a plurality of communication holes 53.

(Ninth Embodiment)

Figure 16:
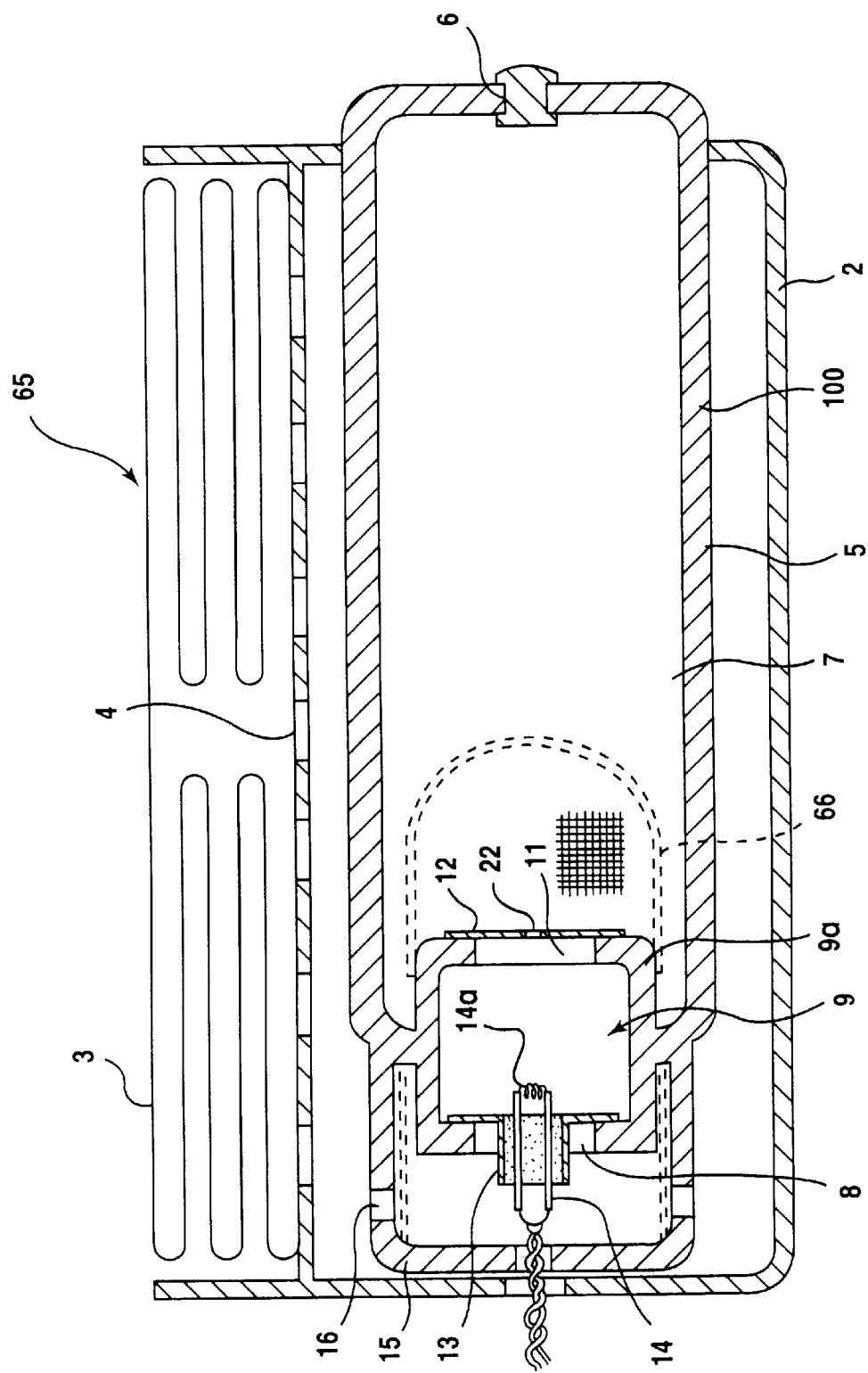
FIG. 16 is a sectional view of an air bag apparatus according to a thirteenth embodiment of the invention.

FIG. 16 shows an arrangement of an air bag apparatus according to the ninth embodiment of the invention. The same reference numerals are allocated to the same elements in the third embodiment. A reference numeral 65 denotes an air bag apparatus of the present embodiment.

In this embodiment, a cap body (or dome body) 66 formed of metal mesh is mounted around a leading end of the first chamber 9 which is protruded into the second chamber 5. The cap body 66 is mounted to the partition wall 9a of the first chamber 9 by welding or the like.

In such an arrangement, when the vehicle is rapidly decelerated due to a collision or the like, the combustion fluid mixture is introduced from the first chamber 9 into the air bag 3 as in the third embodiment.

Meantime, at least a portion of the combustion fluid mixture is introduced into the second chamber 5 through the third vent opening 22 which is formed in the second occluding member 12. The combustion fluid mixture ignites the combustible fluid mixture 7 within the second chamber 5. In this case, the following two steps are taken. First, the cap body 66 is mounted to an exit of the first chamber 9 at the side of the second chamber 5 and thus, the combustible fluid mixture 7 is once burnt within the cap body 66. Second, the entire combustible fluid mixture 7 within the second chamber 5 is burnt thereafter. Therefore, the combustion speed of the combustible fluid mixture 7 within the second chamber 5 can be appropriately retarded to elongate the combustion time. Further, the cap body 66 can also function as a cooling member for the combustion fluid mixture which cools the high-temperature combustion fluid mixture ejected from the first chamber into the second chamber.

In each of the sixth to eighteenth embodiments, the flow path deviating member and the cooling member for the combustion fluid mixture of these embodiments may be used in combination, and they may be provided in either one of the first and second chambers, or in both the chambers.

Further, the cap body 66 may be a metal wire. It is preferable that the metal wire is made of material which is not burnt, and has a sufficient diameter so that it is not melted or burnt. The metal wire may be mounted only in the vicinity of the first chamber 9 or the third vent opening 22, or may be provided such as to cover the entire inner space of the second chamber 5 or such as to have a uniform or an arbitrary density gradient.

Further, as the cooling member for the combustion fluid mixture, a material which deprives a latent heat by endothermic effect or change in phase may be disposed in inner spaces of the first chamber 9 and the second chamber 5.

Examples of such a material are calcium hydroxide, magnesium hydroxide, hydrate of sodium carbonate. These materials absorb heat from high-temperature combustion fluid mixture to generate gas and therefore, they function to lower the temperature of the combustion fluid mixture.

Examples of other means for cooling the temperature of the combustion fluid mixture are a filter made of metal mesh, the module case 2 and the diffuser 15. An endothermic material may be added to these means.

FIGS. 17 to 23 show tenth to thirteenth embodiments. These embodiments include means for controlling the inflating state of the air bag in accordance with various conditions such as a position of a sitting passenger, a difference in physique and the like.

(Tenth Embodiment)

Figure 17:
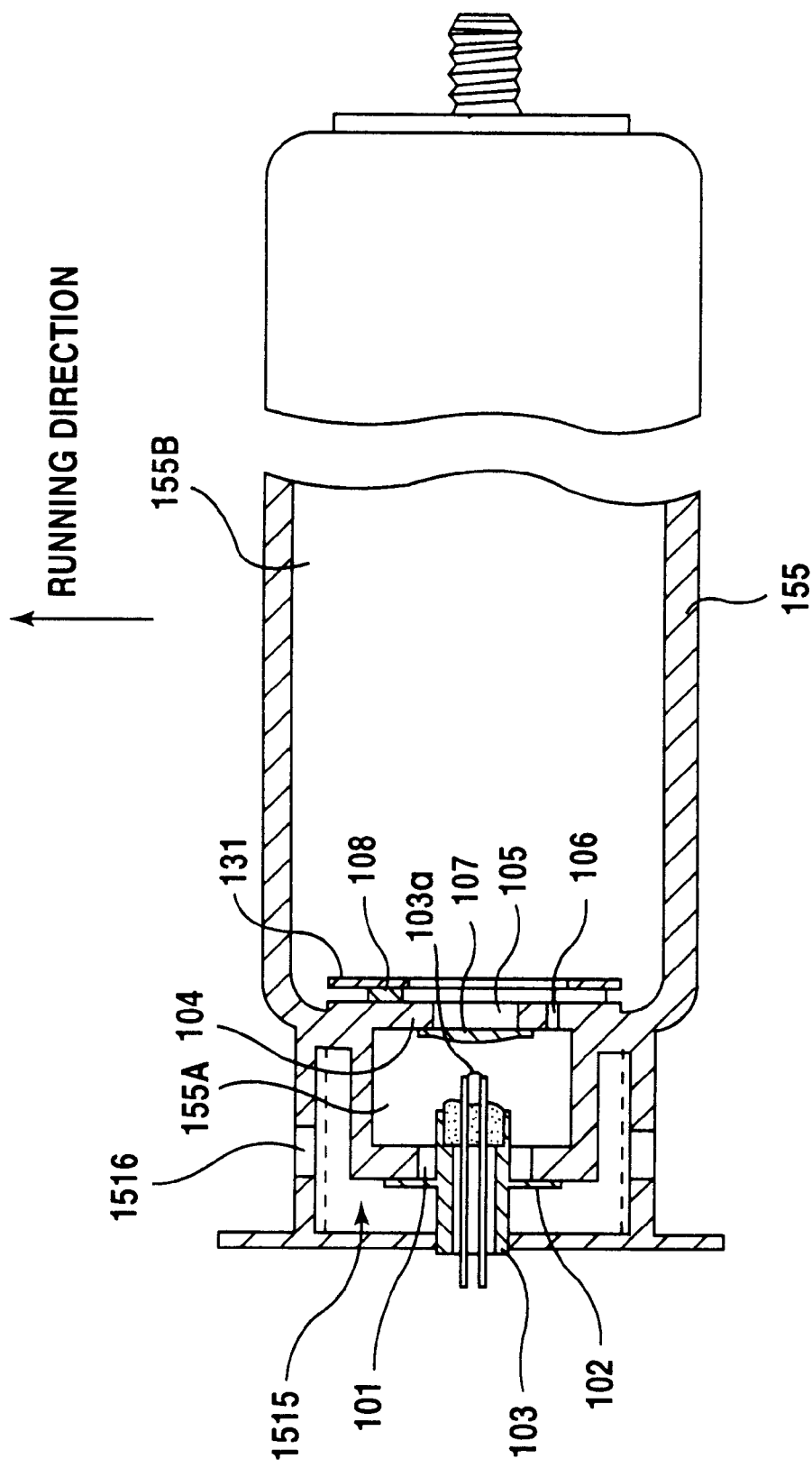
FIG. 17 is a partial sectional view of a gas generating apparatus for an air bag apparatus according to a fifteenth embodiment of the invention.
Figure 18:
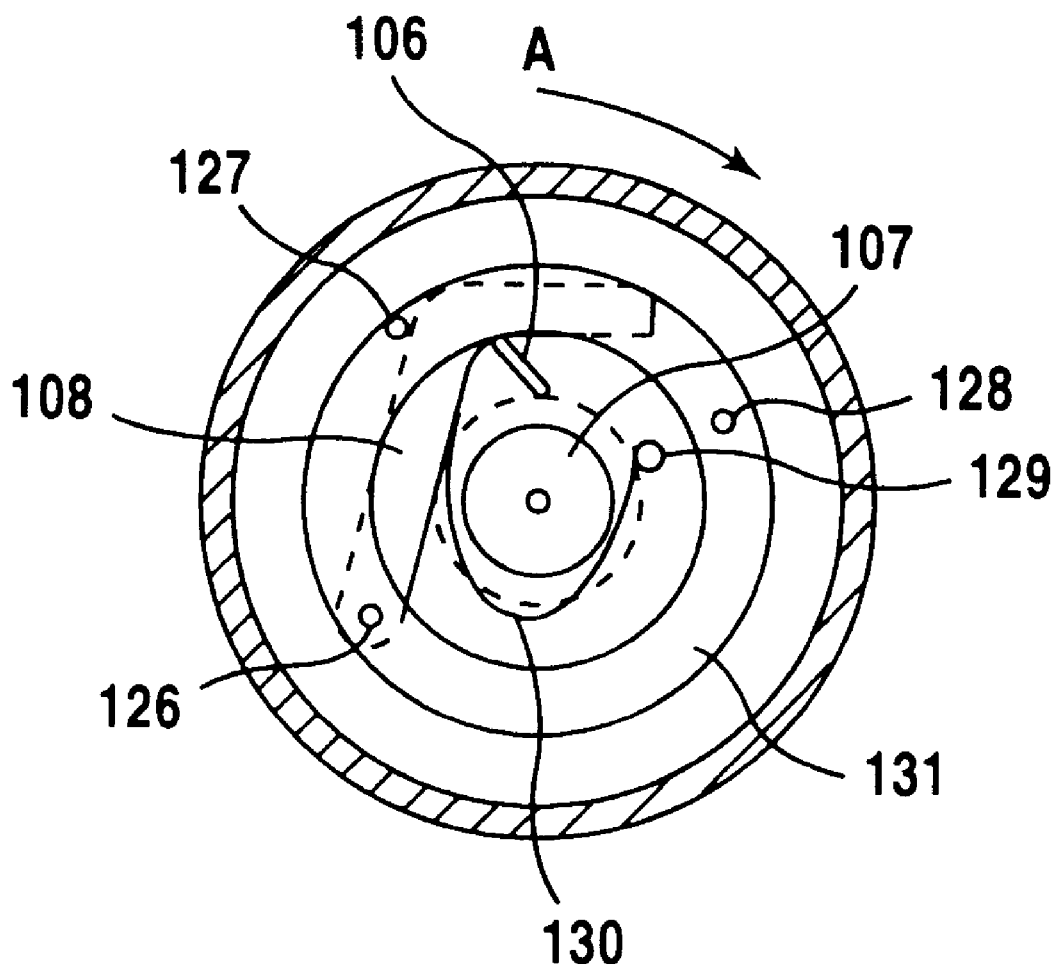
FIG. 18 is a partial sectional view showing a mode of the gas generating apparatus for the air bag apparatus at the time of running of an automobile.

FIGS. 17 and 18 shows an arrangement of an gas generating apparatus for the air bag apparatus according to the tenth embodiment. This gas generating apparatus is disposed such that a longitudinal axis thereof is directed vertically with respect to a running direction of the vehicle. In FIG. 17, a reference numeral 155 denotes a gas generating apparatus which includes a first chamber 155A having a small volume and a second chamber 155B having a large volume. A reference numeral 1515 denotes a diffuser having a plurality of fluid diffusing ports 1516.

The first chamber 155A includes a first vent opening 101, to which a first occluding member 102 integrally provided with an ignition 103 is mounted for occluding the first vent opening 101. The ignition 103 includes an igniting portion 103a in the first chamber 155A. The ignition 103 ignites combustible fluid mixture within the first chamber 155A upon reception of a signal from an ignition circuit which is not shown. The ignition 103 and the first occluding member 102 may be separate parts.

The first and second chambers 155A and 155B are partitioned by a partition wall 104. The partition wall 104 is provided at its central portion with a second vent opening 105. A reference numeral 106 denotes a third vent opening for introducing combustion fluid mixture into the second chamber 155B. The second vent opening 105 is occluded by a second occluding member 107 at the side of the first chamber 105A. The third vent opening 106 is capable of being opened or closed by means of a shutter member 108 which constitutes an inertially moving member at the side of the second chamber 155B.

As is shown in FIG. 18, the shutter member 108 is formed into substantially L-shape, and one end thereof is pivotally supported by the partition wall 104 through a rotating pin 126 such that the shutter member 108 can rotate around the rotating pin 126. It should be noted that the shape of the shutter member 108 is not limited to L-shape, and the shape may variously be changed only if it has the same mechanism. As is shown in FIG. 18, first and second stopper pins 127 and 128 are mounted in the partition wall 104 at opposite sides of the third vent opening 106, respectively. A scope or range of movement of the shutter member 108 is limited by the stopper pins 127 and 128. More specifically, as is shown in FIG. 18, the shutter member 108 is abutted at its central portion of one side edge against the first stopper pin 127, and is displaced, from a position in which the shutter member 108 fully opens the third vent opening 106, toward a direction to close the latter. If the third vent opening 106 is completely closed, the combustion fluid mixture can not be introduced into the second chamber 155B. Therefore, a minimum opening area is secured using the second stopper pin 128 so that the shutter member 108 may not completely close the third vent opening 106. A fixing pin 129 for leaf spring is also mounted to the partition wall 104 as is shown in FIG. 18. A leaf spring 130 is interposed between the fixing pin 129 for leaf spring and the shutter member 108 so that the shutter member 108 is normally abutted against the first stopper pin 127 to keep the third vent opening 106 in its fully opened state. Further, in order to prevent a lateral backlash or looseness of the shutter member 108, each of the pins 127, 128 and 129 is provided with a clearance to such an extent that movement of the shutter member 108 is not prevented, and to which clearance, a ring-like shutter holding plate 131 is mounted.

Next, the operation of the tenth embodiment will be described with reference to FIG. 18. At the time of collision of the automobile, an inertia force is applied to the shutter member 108 in accordance with a driving speed in a driving direction. By such an inertia force, the shutter member 108 is displaced in a direction to decrease the opening area of the third vent opening 106 (in the direction of the arrow A in FIG. 18) around the rotating pin 126.

Substantially simultaneously, the ignition 103 ignites the combustible fluid mixture in the first chamber 155A upon reception of a signal from an ignition circuit which is not shown. A pressure within the first chamber 155A is rapidly increased by heat generated from the combustion, to break the first occluding member 102. Thereafter, the combustion fluid mixture within the first chamber 155A is passed through the first vent opening 101 and the diffuser 1515 and is introduced into the air bag which is not shown.

On the other hand, at least a portion of the combustion fluid mixture generated in the first chamber 155A is passed through the third vent opening 106 which is throttled by the shutter member 108, and is introduced into the second chamber 155B. Such a combustion fluid mixture ignites the combustible fluid mixture within the second chamber 155B. The second occluding member 107 is broken by a difference in pressure between the first and second chambers 155A and 155B and then, the combustion fluid mixture within the second chamber 155B is passed through the second vent opening 105, the first vent opening 101 and the diffuser 1515, and is introduced into the air bag.

In this manner, according to the tenth embodiment, the shutter member 108 controls the opening area of the third vent opening 106 in accordance with the speed of collision of the automobile, to vary the pressure increasing speed within the first chamber 155A thereby controlling the inflation state of the air bag. Therefore, it is possible to inflate and develop the air bag in accordance with the speed of collision.

(Eleventh Embodiment)

Figure 19:
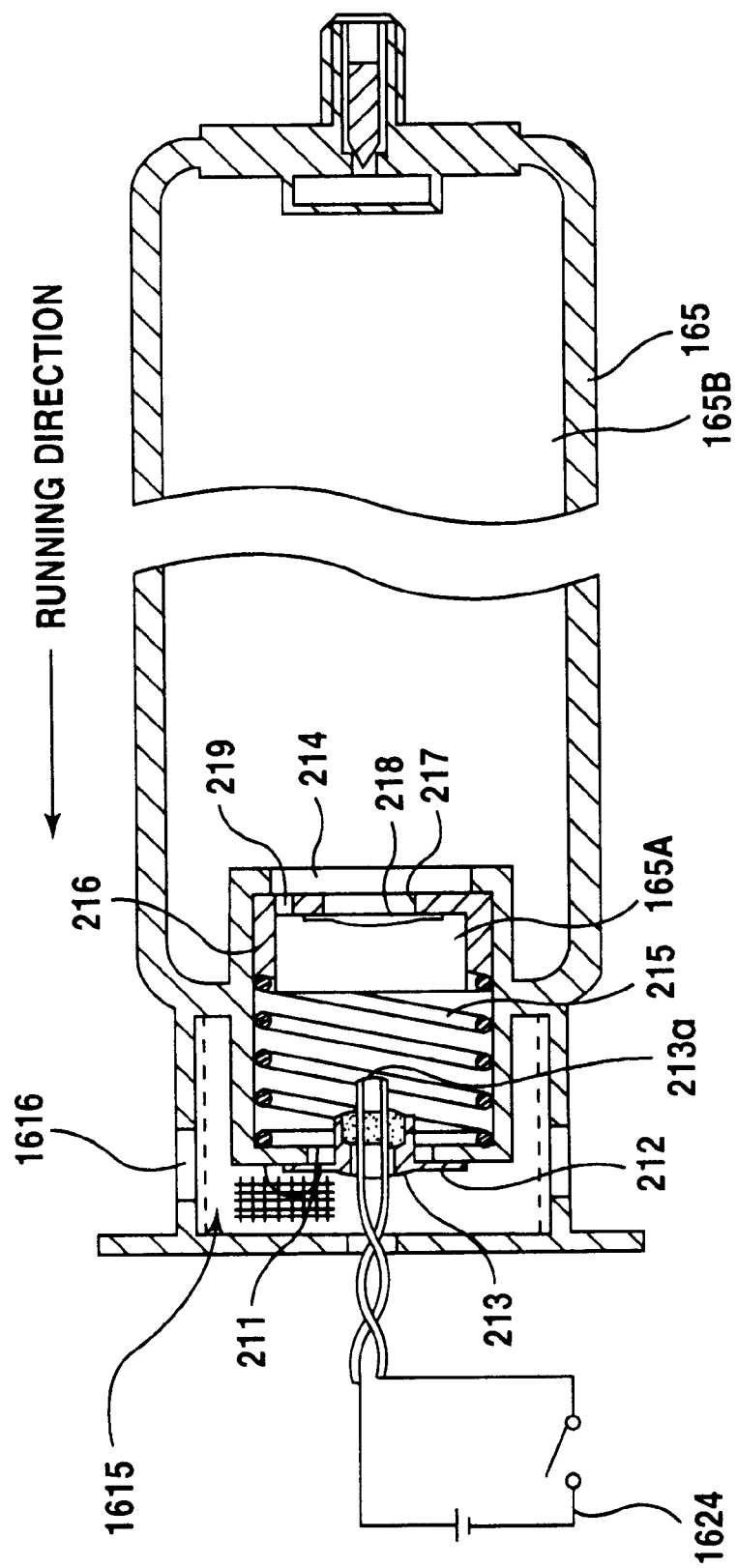
FIG. 19 is a partial sectional view of a gas generating apparatus for an air bag apparatus according to a sixteenth embodiment of the invention.

FIG. 19 shows an arrangement of a gas generating apparatus for an air bag apparatus according to the eleventh embodiment. The gas generating apparatus is disposed such that its longitudinal direction is in parallel to the driving direction of the automobile. In FIG. 19, a reference numeral 165 denotes the gas generating apparatus which includes a first chamber 165A having a small volume and a second chamber 165B having a large volume. A diffuser 1615 includes a plurality of fluid ejecting ports 1616.

The first chamber 165A includes a first vent opening 211. A first occluding member 212 which is integrally provided with an ignition 213 is mounted to the first vent opening 211 to occlude the latter. The ignition 213 includes an igniting portion 213a and is inserted into the first vent opening 211 such that the igniting portion 213a is located within the first chamber 165A. The ignition 213 ignites the combustible fluid mixture within the first chamber 165A upon reception of a signal from an ignition circuit 1624.

The first chamber 165A includes a bottom wall which is located within the second chamber 165B, and the bottom wall is formed with a nozzle 214 which serves as a vent opening. Mounted in the first chamber 165A is a partition member 216 which cooperates with a coil spring 215 to constitute an inertially moving member. The partition member 216 is in a cup-like shape, and is capable of sliding within the first chamber 165A. The partition member 216 is provided at its central portion of the bottom surface with a second vent opening 217 which is in communication with the nozzle 214. The second vent opening 217 is occluded by the second occluding member 218. The partition member 216 also includes a third vent opening 219. Within the first chamber 165A, the coil spring 215 is disposed at the side of the ignition 213, and the partition member 216 is biased by the coil spring 215 and is disposed at the side of the second vent opening 217.

Figure 20:
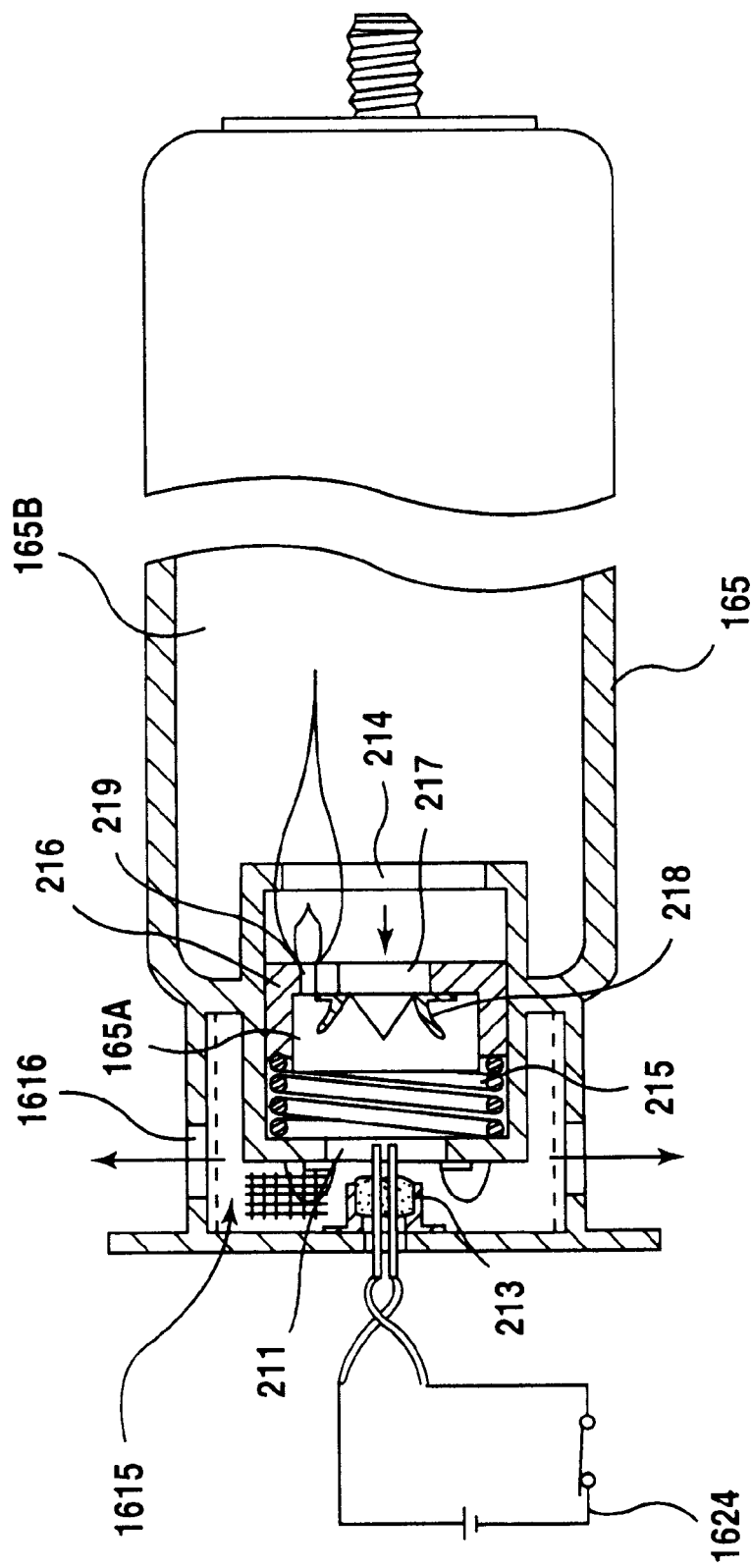
FIG. 20 is a partial sectional view showing a mode of the gas generating apparatus for the air bag apparatus at the time of collision of an automobile.

Next, the operation of the eleventh embodiment will be explained with reference to FIG. 20. At the time of collision of the automobile, an inertia force is applied to the partition member 216 in the driving direction. The partition member 216 is moved toward the ignition 213 by the inertia force which corresponds to a degree of the collision while compressing the coil spring 215, thereby reducing the volume of the first chamber 165A.

Substantially simultaneously, the igniting portion 213 ignites the combustible fluid mixture within the first chamber 165A by a signal from the ignition circuit 1624. At that time, because a volume of the combustible fluid mixture within the first chamber 165A is reduced, the pressure increasing speed in the first chamber 165A is rapidly increased. As a result, the first occluding member 212 is broken more swiftly. The combustion fluid mixture within the first chamber 165A is passed through the first vent opening 211 and the diffuser 1615, and is introduced into the air bag which is not shown.

Meantime, at least a portion of the combustion fluid mixture within the first chamber 165A is passed through the third vent opening 219 and is introduced into the second chamber 165B. Such a combustion fluid mixture ignites the combustible fluid mixture within the second chamber 165B. As a result, the second occluding member 218 is broken by a pressure difference generated between the first chamber 165A and the second chamber 165B. The combustion fluid mixture is passed from the second vent opening 217 through the first vent opening 211 and the diffuser 1615, and is introduced into the air bag.

In this manner, according the eleventh embodiment, the responding time required for starting the inflation of the air bag can be controlled by reducing the volume of the first chamber 165A in accordance with a degree of collision.

(Twelfth Embodiment)

Figure 21:
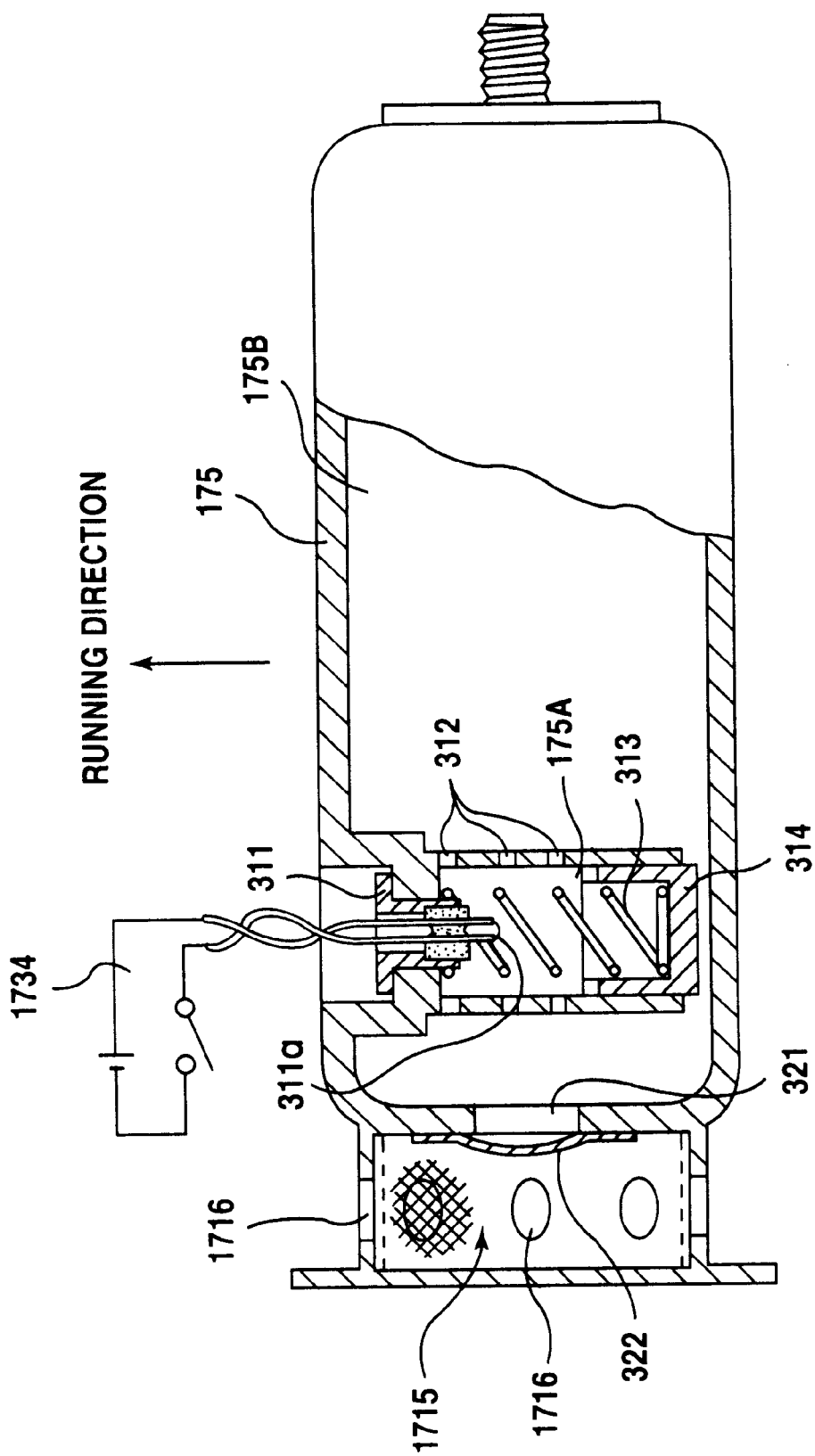
FIG. 21 is a partial sectional view of a gas generating apparatus for an air bag apparatus according to a seventeenth embodiment of the invention.

FIG. 21 shows an arrangement of a gas generating apparatus for an air bag apparatus according to the twelfth embodiment. The gas generating apparatus is disposed such that its longitudinal direction is directed vertically with respect to the driving direction of the automobile. In FIG. 21, the gas generating apparatus 175 includes a first chamber 175A having a small volume and a second chamber 175B having a large volume. A diffuser 1715 includes a plurality of fluid ejecting ports 1716.

The gas generating apparatus 175 is provided at its one end with a first vent opening 321 which is occluded by a first occluding member 322. The ignition 311 is arranged to ignite the combustible fluid mixture within the first chamber 175A upon reception of a signal from an ignition circuit 1734.

The first chamber 175A is disposed along a short axis of the gas generating apparatus 175. The first chamber 175A is provided at its peripheral wall with a plurality of third vent openings 312 which are directed to the longitudinal direction of the second chamber 175B. Mounted in the first chamber 175A is a partition member 314 which cooperates with a coil spring 313 to constitute an inertially moving member. The partition member 314 is in a cup-like shape, and is capable of sliding within the first chamber 175A. The coil spring 313 is disposed at the side of the ignition 311, and the partition member 314 is pushed and biased by the coil spring 313, and is fitted in the first chamber 175A. There, the partition member 314 is pressed against the peripheral wall of the second chamber 175B so that the partition member 314 is not moved in a normal condition. When a speed of collision of the automobile is high and the partition member 314 moves to minimize the volume of the first chamber 175A, it is set that the opening area of each of the third vent openings 312 is secured at a predetermined value.

The operation of the twelfth embodiment will be described next. At the time of collision of the automobile, an inertia force is applied to the partition member 314 in the driving direction. The partition member 314 is moved toward the ignition 311 by the inertia force which corresponds to a degree of the collision while compressing the coil spring 313, thereby reducing the volume of the first chamber 175A as well as opening areas of the third vent openings 312 which are located at positions corresponding to the partition member 314.

Substantially simultaneously, the igniting portion 311a ignites the combustible fluid mixture within the first chamber 175A by a signal from the ignition circuit 1734. At that time, because the volume of the combustible fluid mixture within the first chamber 175A is reduced, the pressure increasing speed in the first chamber 175A is rapidly increased. As a result, the combustion fluid mixture is ejected with high speed through the third vent openings 312, and the combustible fluid mixture within the second chamber 175B is ignited and burned. This causes that the first occluding member 322 is broken more swiftly. The combustion fluid mixture within the second chamber 175B is passed through the first vent opening 321, and is introduced into the air bag which is not shown.

Meantime, at least a portion of the combustion fluid mixture within the first chamber 175A is passed through the third vent opening 312 and is introduced into the second chamber 175B. Such a combustion fluid mixture ignites the combustible fluid mixture within the second chamber 175B. A pressure within the second chamber 175B is increased by the combustion, and when the pressure reaches a predetermined value, the second occluding member 322 is broken. A combustion fluid mixture generated in the second chamber 175B is passed through the second vent opening 321 and is introduced into the air bag.

In this manner, according to the twelfth embodiment, both the volume of the first chamber 175A and the opening area of the third vent openings 312 are simultaneously decreased in accordance with a degree of collision, thereby controlling both the combustion state in the entire apparatus and the inflating characteristic of the air bag.

In this embodiment, the plurality of third vent openings 312 are separately mounted to the first chamber 175A. Therefore, by stepwisely varying their opening areas, the inflating speed of the air bag is stepwisely controlled. Alternatively, a single third opening 312 may be provided and formed in a slit shape. In this case, the opening area can be varied continuously, thereby controlling the inflating speed of the air bag continuously.

(Thirteenth Embodiment)

Figure 22:
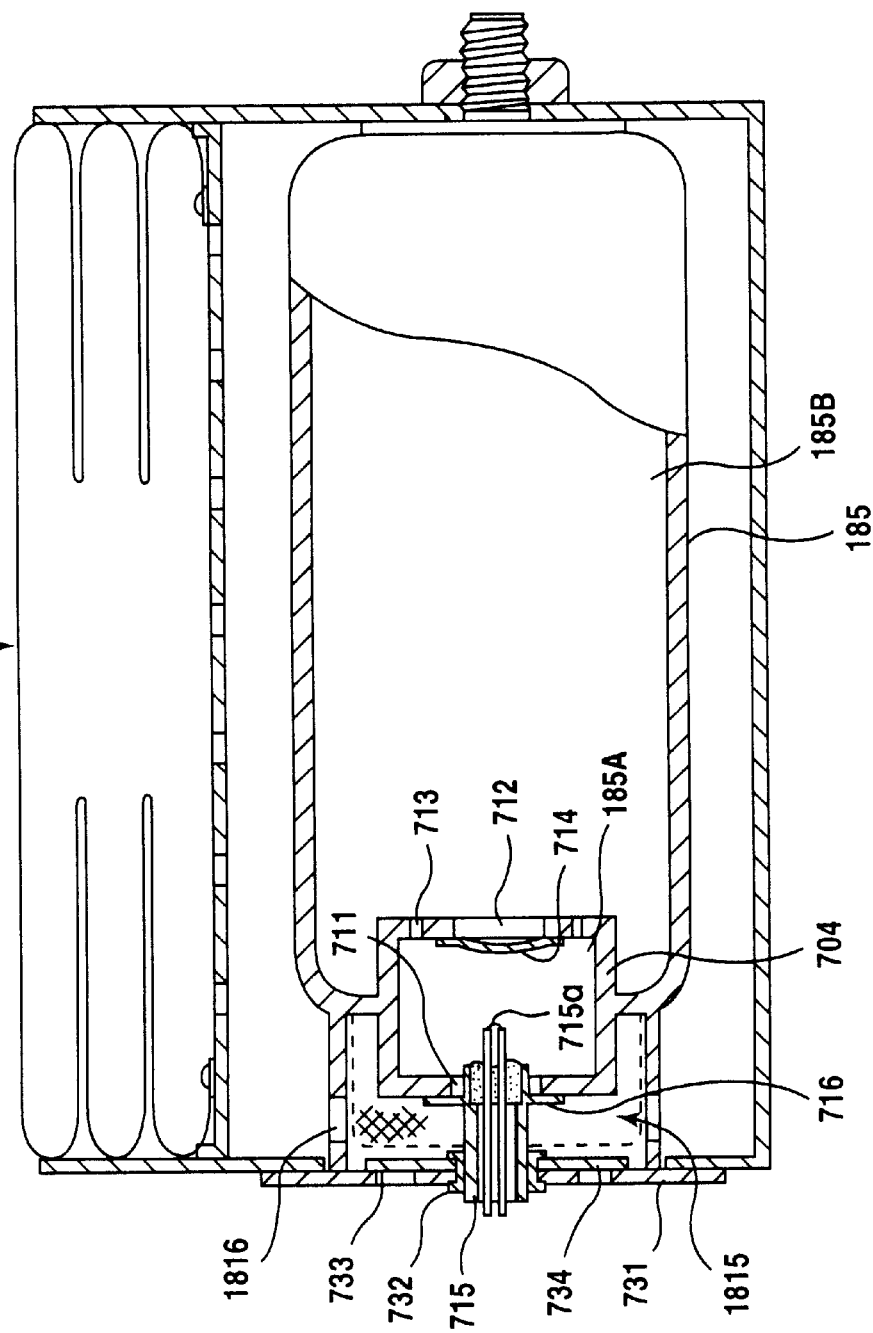
FIG. 22 is a partial sectional view of an air bag apparatus according to a eighteenth embodiment of the invention.

FIG. 22 shows an arrangement of a gas generating apparatus for an air bag apparatus according to the thirteenth embodiment. The gas generating apparatus is disposed such that its longitudinal direction is directed vertically with respect to the driving direction of the automobile. In FIG. 22, a reference numeral 185 denotes the gas generating apparatus which includes a first chamber 185A having a small volume and a second chamber 185B having a large volume. A reference numeral 1815 denotes a diffuser mounted to one end of the second chamber 185B. The diffuser 1815 includes a plurality of fluid ejecting ports 1816.

The first chamber 185A includes a first vent opening 711 and a partition wall 704. The partition wall 704 includes a second vent opening 712 and a third vent opening 713. The second vent opening 712 is occluded by a second occluding member 714.

Figure 23:
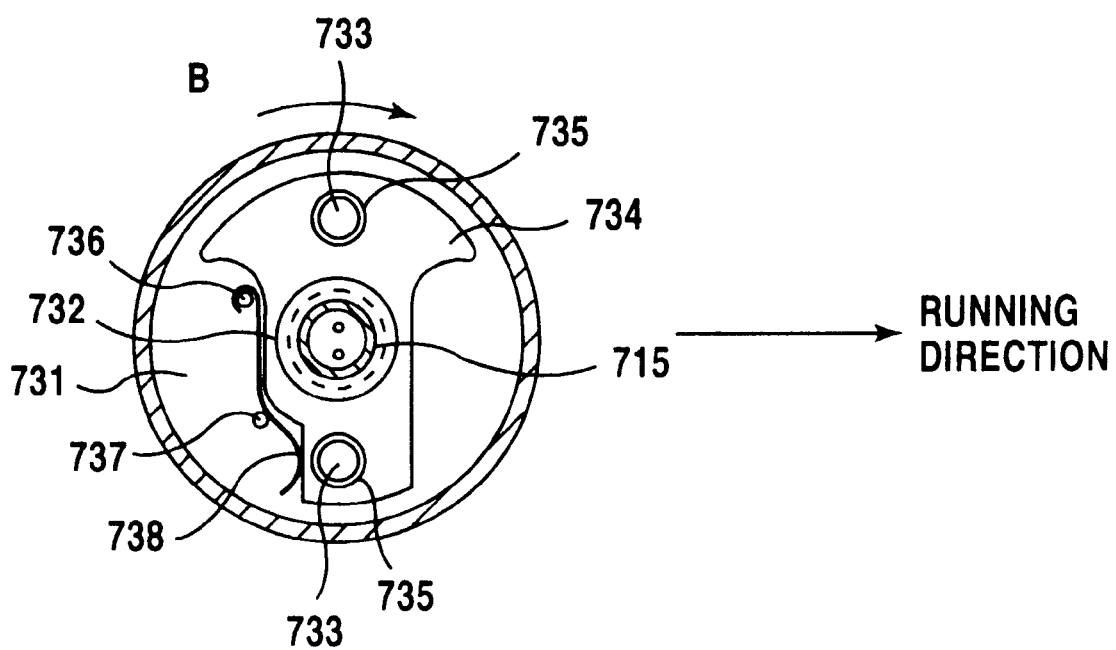
FIG. 23 is a partial sectional view showing a mode of the gas generating apparatus for the air bag apparatus at the time of running of an automobile.

A bush 732 is fixed to a central portion of a ceiling plate 731 of the diffuser 1815, and at least one fluid discharging hole 733 is formed around the bush 732. The bush 732 is mounted to an inner side of the ceiling plate 731, and as is shown in FIG. 23, the ceiling plate is provided with a shutter member 734 which is rotatable around the central portion of the ceiling plate 731 by inertial force. The shutter member 734 comprises a plate material, and is provided at opposite sides of the center of rotation with fluid discharging holes 735 which align with the fluid discharging holes 733 of the ceiling plate 731. In a normal state, the fluid discharging holes 735 of the shutter member 734 align with the fluid discharging holes 733 of the ceiling plate 731 so as to keep a fully opened state. Such a normal position is kept by a stopper pin 736 and a pin 737 for a leaf spring. An ignition 715 is inserted in the bush 732 of the ceiling plate 731 while leaving a small clearance therebetween. The first occluding member 716 occludes the first vent opening 711 of the first chamber 185A. The ignition 715 includes an igniting portion 715a within the first chamber 185A. The ignition 715 is connected to an ignition circuit which is not shown, and ignites the combustible fluid mixture within the first chamber 185A by a signal from the ignition circuit.

Next, the operation of the thirteenth embodiment will be explained. At the time of collision of the automobile, when the gas generating apparatus is operated, the shutter member 734 is rotated (moved) (in the direction of the arrow B in FIG. 23) against a pressing force of a leaf spring 738 in accordance with a shock (or inertia force). As the shutter member 734 is moved, all of or a portion of the fluid discharging holes 733 of the ceiling plate 731 of the diffuser 1815 which had been fully opened are closed.

More specifically, when the shock is equal to or greater than a predetermined set value, the shutter member 734 is moved until such movement is restricted by the stopper pin 736. That is, the fluid discharging holes 733 of the ceiling plate 731 is fully closed, and the combustion fluid mixture is introduced from the fluid ejecting parts 1816 into the air bag. When the shock is smaller than the predetermined set value, the moving amount of the shutter member 734 is varied in accordance with the shock. Because the fluid discharging holes 733 of the ceiling plate 731 and the fluid discharging holes 735 of the shutter member 734 are not aligned, the fluid discharging holes 733 of the ceiling plate 731 are partially opened. Therefore, fluid in an amount corresponding to the opening areas is discharged into an air bag unit, thereby adjusting the amount of the fluid to inflate the air bag.

At the time of opening the first occluding member 716, the ignition 715 is pushed toward the ceiling plate 731 of the diffuser 1815 by the high-pressure combustion fluid mixture to spread out the bush 732, and is received. An opening of the bush 732 is spread out by the insertion of the ignition 715 under pressure and thus, the rotation of the shutter member 734 is prevented and the opening area of each of the fluid discharging holes 733 is kept and fixed.

According to the thirteenth embodiment, the ceiling plate 731 of the diffuser 1815 is provided with the shutter member 734 which is capable of controlling the opening area of the fluid discharging holes 733 in accordance with a degree of collision, and the combustion fluid mixture is selectively discharged, thereby controlling the inflation state of the air bag.

Although the shutter member is rotated (or moved) in accordance with a shock (or inertia force) in the present embodiment, the shutter member 734 may be rotated (or moved) by an electric rotating means. In this case, such rotating means may be means which senses a collision of the automobile and rotates the shutter member 734 in accordance with the magnitude of the shock of the collision. Alternatively, such means may be means which previously senses the state of the passenger (i.e., state such as a position of the passenger, whether the passenger is an adult or a child), so as to rotate the shutter member 734 in accordance with such a state.

POSSIBILITY OF INDUSTRIAL UTILIZATION

As is apparent from the above described embodiments, according to the air bag apparatus of the present invention, it is possible to effectively and swiftly supply a combustion fluid mixture which is generated after a combustible fluid mixture is sufficiently burnt, and a time period for completing the inflation of the air bag can variously varied with a simple structure.

Further, the present invention can provide an inflation characteristic which corresponds to various conditions at the time of operation of the air bag apparatus.

What is claimed is:

1. A gas generating apparatus for an air bag apparatus, comprising:

a first chamber accommodating a combustible fluid and provided with a first vent opening which is in communication with an air bag;

a second chamber which is larger than said first chamber and which accommodates at least one of a combustible fluid and an inert fluid;

a first occluding member for occluding said first vent opening; and ignition means for igniting the combustible fluid in said first chamber: wherein at least a portion of the combustible fluid in said first chamber is burnt, thereby discharging the fluid in said first and second chambers through said first vent opening to inflate said air bag.

2. A gas generating apparatus for an air bag apparatus according to claim 1, further including a second vent opening for bringing said first and second chambers into communication with each other, and a second occluding member for occluding said second vent opening, wherein when the combustible fluid in said first chamber is burnt, said first chamber is substantially closed.

3. A gas generating apparatus for an air bag apparatus according to claim 2, wherein said second occluding member is provided outside said first chamber.

4. A gas generating apparatus for an air bag apparatus according to claim 2, wherein said second occluding member is provided inside said first chamber.

5. A gas generating apparatus for an air bag apparatus according to claim 2, wherein said second occluding member is formed to be broken easier by a pressure from said second chamber than by a pressure from said first chamber.

6. A gas generating apparatus for an air bag apparatus according to any one of claims 2 to 5, wherein said first chamber includes a third vent opening which is in communication with said second chamber, said third vent opening having at least one of an opening area smaller than that of said second vent opening and a length longer than that of said second vent opening.

7. A gas generating apparatus for an air bag apparatus according to claim 6, wherein said third vent opening is formed in a side wall of said first chamber.

8. A gas generating apparatus for an air bag apparatus according to claim 6, wherein said third vent opening is formed in said second occluding member.

9. A gas generating apparatus for an air bag apparatus according to any one of claims 1 to 5, wherein said first occluding member is broken by an increase in pressure within said first chamber.

10. A gas generating apparatus for an air bag apparatus according to any one of claims 2 to 5, wherein said second occluding member is broken by a difference between a pressure within said first chamber and a pressure within said second chamber.

11. A gas generating apparatus for an air bag apparatus according to claim 1, wherein said first chamber is provided at one end thereof with said first vent opening, and the other end of said first chamber is formed into a narrow cylindrical shape and is opened within said second chamber.

12. A gas generating apparatus for an air bag apparatus according to any one of claims 1 to 5 or 11, wherein said first chamber is provided, at an end surface thereof to which said first vent opening is provided, with a gas diffusing member having a plurality of fluid diffusing holes directed in a radical direction.

13. A gas generating apparatus for an air bag apparatus according to any one of claims 1 to 5 or 11, wherein at least one of said first chamber and said second chamber includes an oxidizer, or the oxidizer and an inert gas.

14. A gas generating apparatus for an air bag apparatus according to claim 1, further including a third vent opening for bringing said first and second chambers into communication with each other, and control means for controlling a communication state of said third vent opening and an inflation state of said air bag.

15. A gas generating apparatus for an air bag apparatus according to claim 14, wherein said control means includes a shutter member for closing said third vent opening between a fully opened state and a minium opening area, said shutter member maintains said third vent opening in the fully opened state in a normal state, closes said third vent opening such as to assume said minimum opening area upon a collision at high speed, and in other cases, operates to bring said third vent opening to assume a predetermined opening area between said fully opened state and said minimum opening area in accordance with a degree of the collision.

16. A gas operating apparatus for an air bag apparatus according to claim 14, wherein said control means includes an inertially moving member mounted within said first chamber, said inertially moving member decreasing a volume of said first chamber in accordance with a degree of collision at the time of collision.

17. A gas generating apparatus for an air bag apparatus according to claim 16, wherein said inertially moving member is biased in a direction to maximize the volume of said first chamber.

18. A gas generating apparatus for an air bag apparatus according to claim 16 or 17, wherein said first chamber is provided such as to extend into said second chamber in an axial direction thereof.

19. A gas generating apparatus for an air bag apparatus according to claim 16 or 17, wherein said first chamber is provided to extend in said second chamber in a direction substantially perpendicular to an axial direction of said second chamber.

20. A gas generating apparatus for an air bag apparatus according to any one of claims 16 or 17, wherein said third vent opening comprises a plurality of openings in a side wall of said first chamber at a predetermined distance from one another in a longitudinal direction of said first chamber, said inertially moving member occludes a predetermined number of said plurality of openings in accordance with a degree of collision.

21. A gas generating apparatus for an air bag apparatus according to claim 20, wherein said inertially moving member maximizes the volume of said first chamber, and is biased in a position to open all of said third vent openings.

22. A gas generating apparatus for an air bag apparatus according to claim 20, wherein said third vent opening comprises a slit portion formed such as to extend in a longitudinal direction of said first chamber.

23. A gas generating apparatus for an air bag apparatus according to claim 1, further including a discharging means provided between said first vent opening and said air bag or discharging gas to an exterior, and a control means for controlling a communication state between said discharging means and said exterior in accordance with a predetermined condition, wherein said control means controls the inflation state of said air bag.

24. A gas generating apparatus for an air bag apparatus according to claim 23, wherein said discharging means includes a discharge port, wherein said control means includes a shutter member for adjusting said discharge port between a fully opened state and fully closed state, said shutter member maintains the fully opened state of said discharge port in a normal state, closes said discharge port completely upon a collision at high speed, and in other cases, adjusts to bring said discharge port into a predetermined opened state between said fully opened state and said fully closed state in accordance with a degree of the collision.

25. A gas generating apparatus for an air bag apparatus according to claim 1, wherein said ignition means includes an igniting portion extending into said first chamber.

26. A gas generating apparatus for an air bag apparatus, comprising:

a first chamber accommodating a combustible fluid and provided with a first vent opening which is in communication with an air bag;

a second chamber which is larger than said first chamber and which accommodates at least one of a combustible fluid and an inert fluid;

a first occluding member for occluding said first vent opening, a second vent opening for bringing said first chamber and said second chamber into communication with each other;

a second occluding member for occluding said second vent opening;

a third vent opening for bringing said first chamber and said second chamber into communication with each other said third vent opening having at least one of a sectional area smaller than that of said second vent opening and a length longer than that of said second vent opening; and ignition means for igniting the combustible fluid in said first chamber; wherein at least a portion of the combustible fluid in said first chamber is burnt by said ignition means, a fluid in said second chamber is at least one of burnt and expanded in said third vent opening, a fluid in said first chamber is discharged from said first vent opening, and the fluid in said second chamber is discharged from said first vent opening through at least said second vent opening, thereby inflating said air bag.

27. A gas generating apparatus for an air bag apparatus according to claim 26, wherein said third vent opening is formed on a center axis of said second chamber.

28. A gas generating apparatus for an air bag apparatus according to claim 26, wherein said third vent opening is formed at a location deviated from a center axis of said second chamber.

29. A gas generating apparatus for an air bag apparatus according to claim 26, wherein a longitudinal axis of said third vent opening is in parallel to a center axis of said second chamber.

30. A gas generating apparatus for an air bag apparatus according to claim 26, wherein a longitudinal axis of said third vent opening is directed in a direction intersecting a center axis of said second chamber.

31. A gas generating apparatus for an air bag apparatus according to claim 26, wherein said second chamber is formed into a cylindrical shape, and a longitudinal axis of said third vent opening is directed in a circumferential direction of said second chamber.

32. A gas generating apparatus for an air bag apparatus according to claim 26, wherein said third vent opening comprises a plurality of openings, longitudinal axes of said third vent openings are regularly directed, or irregularly directed in multiple directions.

33. A gas generating apparatus for an air bag apparatus according to any one of claims 26 to 32, further including flow path deviating means for deviating a direction of the outflow of a fluid ejecting from said first chamber to said second chamber through said third vent opening.

34. A gas generating apparatus for an air bag apparatus according to claim 33, wherein said flow path deviating means is selected from at least one of a plate, a mesh and a metal mesh provided in at least one of said first chamber and said second chamber.

35. A gas generating apparatus for an air bag apparatus according to claim 32, wherein a sum of sectional areas of said third vent openings is set in a range of 0.10 mm$^2$ to 20 mm$^2$.

36. A gas generating apparatus for an air bag apparatus according to any one of claims 26 to 32, wherein a length of said third vent opening is set in a range of 0.2 mm to 100 mm.

37. A gas generating apparatus for an air bag apparatus according to claim 26, further including combustion gas cooling means for cooling a fluid ejected from said first chamber to said second chamber through said third vent opening.

38. A gas generating apparatus for an air bag apparatus according to claim 37, wherein said combustion gas cooling means is selected from at least one of a plate, a mesh and a metal mesh provided in at least one of said first chamber and said second chamber.

39. A gas generating apparatus for an air bag apparatus according to any one of claims 26 to 38, wherein said second vent opening is set to be opened when a predetermined time period is elapsed after said ignition means operates.

40. A gas generating apparatus for an air bag apparatus according to claim 39, wherein said second occluding member is broken when a pressure within said first chamber reaches a predetermined value.

41. A gas generating apparatus for an air bag apparatus according to claim 39, wherein said second occluding member is mechanically broken.

42. A gas generating apparatus for an air bag apparatus, comprising:

a first chamber accommodating a combustible fuel and having a first vent opening; and a second chamber including a partition wall having a second vent opening and a third vent opening; wherein a portion of combustion product created in said first chamber is passed through said third vent opening and introduced into said second chamber, a combustion product created in said second chamber is introduced from said second vent opening into said first chamber, and the combustion products created in said first and second chambers are discharged from said first vent opening.

43. A gas generating apparatus for an air bag apparatus, comprising: at least two chambers capable of communicating with each other; and a fluid accommodated in each of said chambers; wherein one of said two chambers includes an ignition member, the fluid accommodated in at least said one chamber is combustible fluid, the combustible fluid is ignited in said one chamber, and both said fluids are discharged from said one chamber where the combustible fluid is ignited.

44. A method of inflating an air bag, wherein the bag is inflated by a gas generating apparatus comprising a first chamber having an ignition member, a second chamber, and a combustible fluid accommodated in at least the first chamber, said method comprising the steps of:

igniting the combustible fluid in said first chamber by the ignition member;

introducing, into said second chamber, at least a portion of a combustion fluid mixture created in said igniting step;

introducing, into the air bag, at least a portion of said combustion fluid mixture created in said igniting step; and introducing at least a portion of said combustion fluid mixture within said second chamber from said second chamber through said first chamber into the air bag.

* * * * *